United States Patent
Davi et al.

(10) Patent No.: US 10,861,083 B2
(45) Date of Patent: Dec. 8, 2020

(54) USER INTERFACE USING TAGGED MEDIA, 3D INDEXED VIRTUAL REALITY IMAGES, AND GLOBAL POSITIONING SYSTEM LOCATIONS, FOR ELECTRONIC COMMERCE

(71) Applicant: Imagine Universe, Inc., Laguna Beach, CA (US)

(72) Inventors: Gary Davi, Laguna Beach, CA (US); Mark Madison, Laguna Beach, CA (US)

(73) Assignee: Imagine Universe, Inc., Laguna Beach, CA (US)

( * ) Notice: Subject to any disclaimer, the term of this patent is extended or adjusted under 35 U.S.C. 154(b) by 358 days.

(21) Appl. No.: 15/322,091

(22) PCT Filed: Jun. 26, 2015

(86) PCT No.: PCT/US2015/037840
§ 371 (c)(1),
(2) Date: Dec. 23, 2016

(87) PCT Pub. No.: WO2015/200732
PCT Pub. Date: Dec. 30, 2015

(65) Prior Publication Data
US 2017/0148090 A1 May 25, 2017

Related U.S. Application Data

(60) Provisional application No. 62/073,808, filed on Oct. 31, 2014, provisional application No. 62/027,660, (Continued)

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0609* (2013.01); *G06Q 30/0633* (2013.01)

(58) Field of Classification Search
CPC ..... G06Q 30/06; G06Q 30/0601–0643; G06Q 30/08
See application file for complete search history.

(56) References Cited

U.S. PATENT DOCUMENTS

| 2003/0172005 | A1  | 9/2003 | Hellal et al. |
| 2012/0191572 | A1* | 7/2012 | Mengerink ........ G06Q 30/0635 705/26.81 |

(Continued)

OTHER PUBLICATIONS

Seamless Online/Offline Shopping Experience Design for In-store Customers. Udana Bandara. Rakuten Institute of Technology, Rakuten Inc. Feb. 14-17, 2012. (Year: 2012).*

(Continued)

*Primary Examiner* — William J Allen
(74) *Attorney, Agent, or Firm* — Mahamedi IP Law LLP

(57) ABSTRACT

A user interface operated via at least one consumer computing device, a database, and at least one host computer processor, provide an electronic commerce (eCommerce) environment for secured transactions between consumer and vendor members subscribed to the environment. Digital product images are scaled into digital images of environments of intended use for virtual reality observation. Tags to product representations or other features of media performance transmissions are scanned by consumer members for product purchasing, saving for later purchase, and/or sharing with other consumers (e.g. via social networks). Consumers create their own consumer product store with an inventory of items saved within the environment database for later purchasing or sharing. Original vendors initially providing items saved by consumers are rewarded commissions if later purchased from other vendors. Sharing saved items between consumers is also rewarded and provides an efficient B2C2C sCommerce environment and marketplace centered on products and driven by consumers.

3 Claims, 9 Drawing Sheets

Related U.S. Application Data filed on Jul. 22, 2014, provisional application No. 62/024,589, filed on Jul. 15, 2014, provisional application No. 62/023,590, filed on Jul. 11, 2014, provisional application No. 62/023,070, filed on Jul. 10, 2014, provisional application No. 62/020,947, filed on Jul. 3, 2014, provisional application No. 62/020,936, filed on Jul. 3, 2014, provisional application No. 62/018,500, filed on Jun. 27, 2014.

(56) References Cited

U.S. PATENT DOCUMENTS

| | | | |
|---|---|---|---|
| 2014/0019297 A1* | 1/2014 | Iskra | G06Q 30/0609 |
| | | | 705/26.8 |
| 2014/0046794 A1* | 2/2014 | Vallery | G06Q 30/0631 |
| | | | 705/26.7 |
| 2014/0089135 A1* | 3/2014 | Linh | G06O 30/0601 |
| | | | 705/26.7 |
| 2014/0164171 A1* | 6/2014 | Lu | G06Q 30/0207 |
| | | | 705/26.7 |
| 2015/0120417 A1* | 4/2015 | Kim | G06Q 30/0613 |
| | | | 705/14.23 |
| 2015/0302449 A1* | 10/2015 | Akbarpour | G06F 16/9535 |
| | | | 705/14.23 |
| 2016/0335707 A1* | 11/2016 | Ranasinghe | G06Q 30/0641 |

OTHER PUBLICATIONS

European Search Report dated Dec. 4, 2017, EP Application No. 15812230.9, 9 pages.

* cited by examiner

USER INTERFACE USING TAGGED MEDIA, 3D INDEXED VIRTUAL REALITY IMAGES, AND GLOBAL POSITIONING SYSTEM LOCATIONS, FOR ELECTRONIC COMMERCE

TECHNICAL FIELD

This disclosure relates to a system and method providing a user interface using tagged media, 3D indexed virtual reality images, and global positioning system (GPS) location sensing, in an electronic commerce environment.

DETAILED DESCRIPTION

As illustrated by various descriptions provided below, certain aspects of this disclosure relate to providing an enhanced electronic commerce (eCommerce) 'ecosystem' environment in which numerous benefits are enjoyed by consumers, as well as businesses and other parties involved in the general supply chain, who are subscribing 'members' of the environment.

Figure 1:
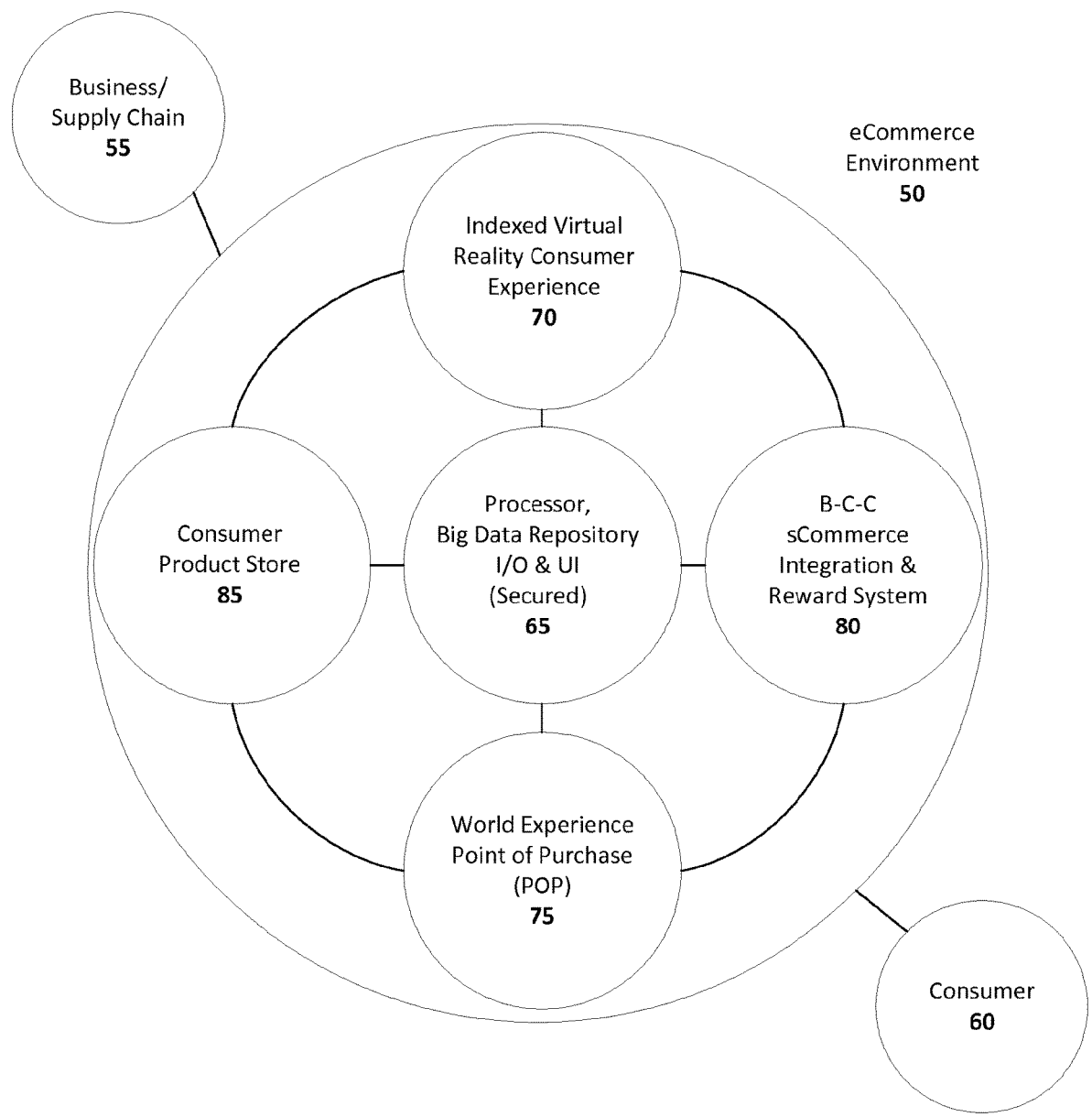
FIG. 1 shows a schematic Venn diagram of an eCommerce environment according to one aspect of this disclosure.

According to certain such aspects, FIG. 1 shows an electronic commerce (eCommerce) ecosystem or environment 50 that facilitates multiple financial, product purchase, and sharing transactions between subscribing vendor members of a Business/Supply Chain 55 and subscribing consumer members 60 of the environment. The environment is securely operated via a central nervous system 65 that includes one or more computer processors or servers, and may also include a user interface system that includes a user input interface and a user output interface (e.g. together "I/O"), such as via a display. As would be apparent to one of ordinary skill based on this disclosure, this system 65 may be implemented by one or more cooperating computing devices. According to one highly beneficial more detailed embodiment, for example, consumer members may access the environment via a touch icon on a touch screen of a mobile computing device, such as for example a mobile phone, notepad, or tablet.

As further shown in FIG. 1, the eCommerce environment 50 provides, in one regard, an Indexed Virtual Reality Consumer Experience 70. Digital images of products provided by vendor members are imported by consumer members into digital images of environments of intended use by the consumer member (e.g. furniture products in rooms, clothing or jewelry on people, etc.). In another regard, a world experience point of purchase (POP) 75 environment provides for vendor members to tag media transmissions with ID/purchase information tags for products, services, or other sales items (e.g. "items") embedded in such media transmissions (e.g. movies, pictures, shows, advertisements, audio). These media transmissions can be scanned by consumer members in a manner adapted to capture the item tags and thereby enable purchasing, reviewing or saving the item information for later purchase, or sharing of the item information with others. A business-to-consumer-to-consumer (B2C2C) social commerce (sCommerce) 80 environment also promotes and rewards consumer members for sharing products with other consumer members.

In addition, a consumer product store 85 environment is also provided that, among other benefits, virtually replaces and obviates the need for consumers to purchase items on-line via conventional on-line 'shopping carts' typically provided by product vendors.

Certain embodiments also provide an environment in which the general living experience of consumers (e.g. "world experience") is better harnessed for improved eCommerce.

Further detailed embodiments of these and other aspects of this disclosure are provided below.

Indexed Virtual Reality Consumer Experience

According to certain aspects of this disclosure, an indexed virtual reality consumer experience 70 environment is provided to enhance a consumer's ability to virtually observe and integrate a product within its intended environment of use prior to purchasing that product.

According to certain more detailed embodiments described below, a digital indexed virtual reality image environment is provided with a user interface, comprising a display and user input interface, in which a purchasing consumer member of the environment can import and position digital images of products at multiple positions inserted within a digital image of an intended environment of use for such product—thereby transforming the product and environment images into a fused virtual reality image of the product as integrated within its intended environment of use for virtual reality viewing. Among other benefits, this environment thus allows the consumer member to first 'try out' the product, in its intended use environment, before purchasing it.

While various architectures may be provided to support the broad aspects of this virtual reality experience, one particular embodiment is described by reference to FIG. 2 as follows.

Figure 2:
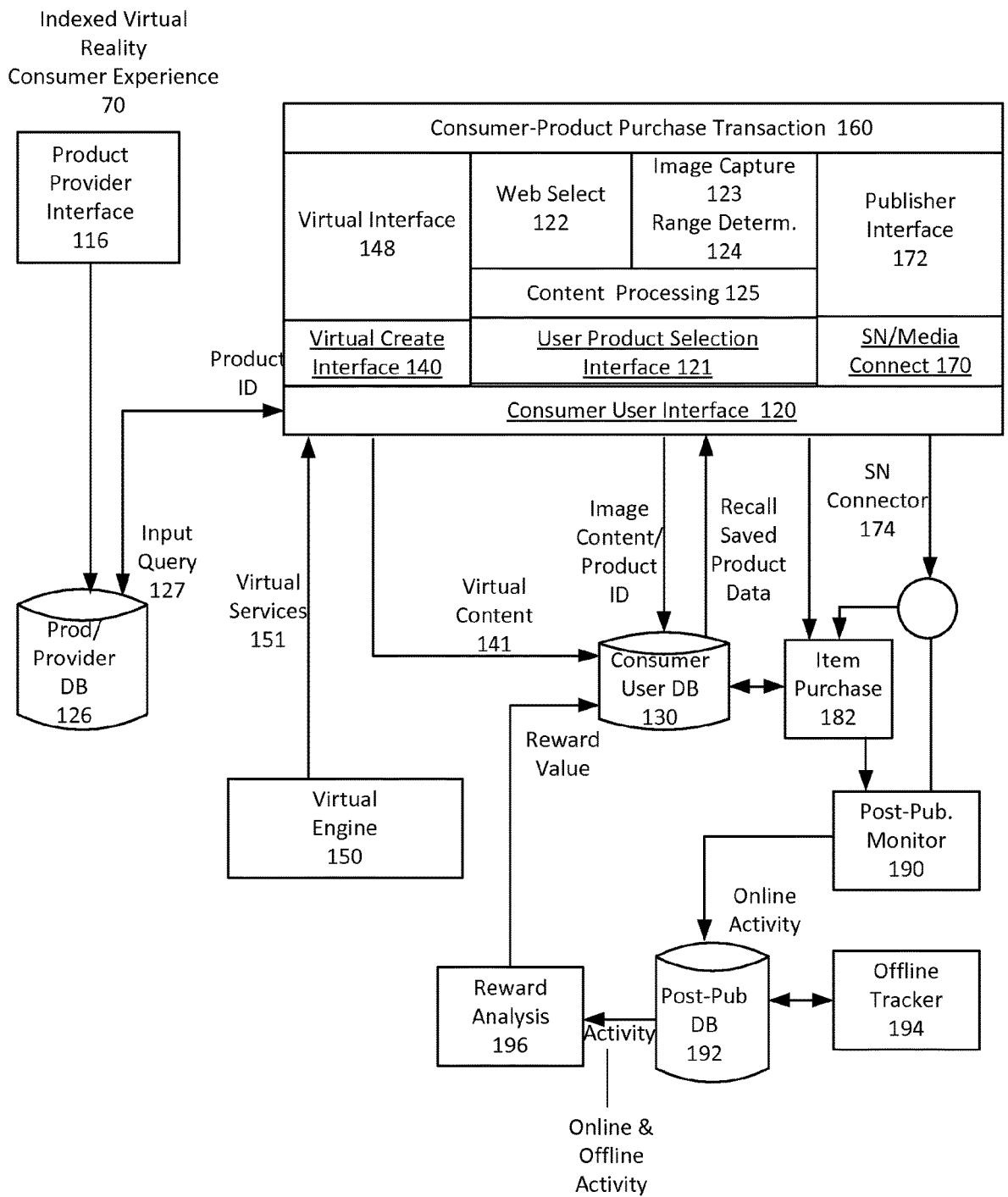
FIG. 2 shows a schematic block flow diagram of an eCommerce environment system according to another aspect of this disclosure.

As shown in FIG. 2, the Indexed Virtual Reality Consumer Experience 70 as a sub-environment under the eCommerce Environment 50 (shown in FIG. 1, and incorporated into this FIG. 2 description by reference) includes a Product Provider Interface 116 for product vendor members, and a Consumer User Interface 120 for consumer members, who respectively subscribe to the environment. While such subscriptions may take many different forms and requirements to suit a particular need, in one beneficial arrangement requirements include subscription fees, and agreements to certain policies and procedures such as with respect to ensuring privacy, security, appropriate content and other practices in the respective conduct within the environment.

The consumer user interface 120 provides for multiple avenues by which appropriate digital images may be acquired via a User Product Selection Interface 121 for use within the overall indexed virtual reality consumer experience. A camera may be used for Image Capture 123 for example, and Range determination 124 may be made for a reference in the image for use in index scaling of the product image within the environment image. For example, certain cameras are commercially available, as are range measurement tools associated with cameras, and may be deployed together for this purpose (such as for example an "EasyMeasure™" app commercially available for certain camera phone platforms). Content Processing 125 is then performed to provide a digital image together with the range measurement. In addition or in the alternative, a Web Select 122, or other avenues to reference other sources of images (such as stored on a local computer readable or remote memory resource), may be performed to simply select a suitable image already provided.

A complex database, or multiple separate or networked databases, may be provided to support the various activities conducted within the eCommerce environment 50 of FIG. 1, including the sub-environment 70 as further herein developed by reference to FIG. 2. Generally, the database will include, among other things: consumer member account information & saved images, and other data; and vendor member account information, ID and other relevant information for respective products available for sale, etc.

In the particular embodiment shown in FIG. 2 (and as would apply similarly to other present embodiments, as apparent to one of ordinary skill), a Product Provider DB 126 is provided for vendor-related purposes. In this embodiment, an input query 127 can provide access to product ID, product images, or other product-related information via the consumer user interface 120 to support the various business-to-consumer (B2C) activities intended under this eCommerce environment 50 and/or more specific virtual reality consumer experience 70 sub-environment (and while other purposes, such as business-to-business or "B2B," can also be supported by this database and system architecture around it).

Another consumer user database or "DB" 130 is also provided for consumer-member related purposes, including to store image content/product ID information derived by the User Product Selection interface 121, as further developed below.

The consumer user interface 120 further includes a Virtual Interface 148 with a Virtual Create Interface 140, and which is supported by a Virtual Engine 150 with Virtual Services 151, which may comprise for example a computer processor operated according to a set of encoded computer instructions to perform such respective operations. This arrangement provides one particular example of a processor-driven support and interface system for allowing the user to create the digital indexed virtual reality image that fuses the digital product image into the digital environment image. That resulting Virtual Content 141 may also be stored within the Consumer User DB 130 as shown.

It is to be appreciated that a consumer member is allowed to do a number of activities with image content, product IDs, and virtual image environments captured or created per the above description. In one regard, the consumer member may purchase a product related to such activities, and which may either be at the point of capture such as at Consumer-Product Purchase Transaction 160 (and which may, or may not, require storing the purchased product information). In another regard, the consumer member may recall a stored record for later evaluation, purchase, or forwarding to another.

In this latter regard, the eCommerce Environment 50 (and including each respective sub-environment provided in FIG. 1), may thus be configured to allow, and in fact promote and reward, a consumer member sharing of content captured or created with the environment with one or more other consumer members. In one exemplary embodiment shown, a Social Network (SN)/Media Connect 170 is facilitated within the environment with a publisher hosted interface 172 (e.g. Facebook, for example) to support sharing of such product information from one consumer member to another (and also sharing of information and transactions between businesses/vendors). As shown in FIG. 2, an SN Connector 174 related to the sharing of a product by one consumer member with another consumer member via the SN/Media Connect 170 may result in an item purchase 182 by the recipient consumer member of the sharing.

According to a further embodiment shown in FIG. 2, a Post-Publication Monitor 190 is also supported by the eCommerce Environment system 50 (e.g. via the virtual reality consumer experience 70 sub-environment) and monitors the sharing between consumer members as source members and recipient members, and items purchased 182 as a result. Records of on-line activity related to such product sharing and related downstream purchase transactions are stored in a Post-Publication DB 192. An Offline Tracker 194 is also provided, and which tracks item purchases made by a recipient off-line and outside of the virtual reality consumer experience 70 environment (or broader eCommerce Environment 50, for that matter) back to the source recipient of the on-line sharing of the item by the source member within the environment 50 (e.g. virtual reality consumer experience 70). Both online and offline SN sharing and related purchases are evaluated by a Reward Analysis 196, and with reward value delivered back to the source member, such as by generating a record in the Consumer User DB 130. Other activity may also be tracked, as further described elsewhere herein.

Figure 3:
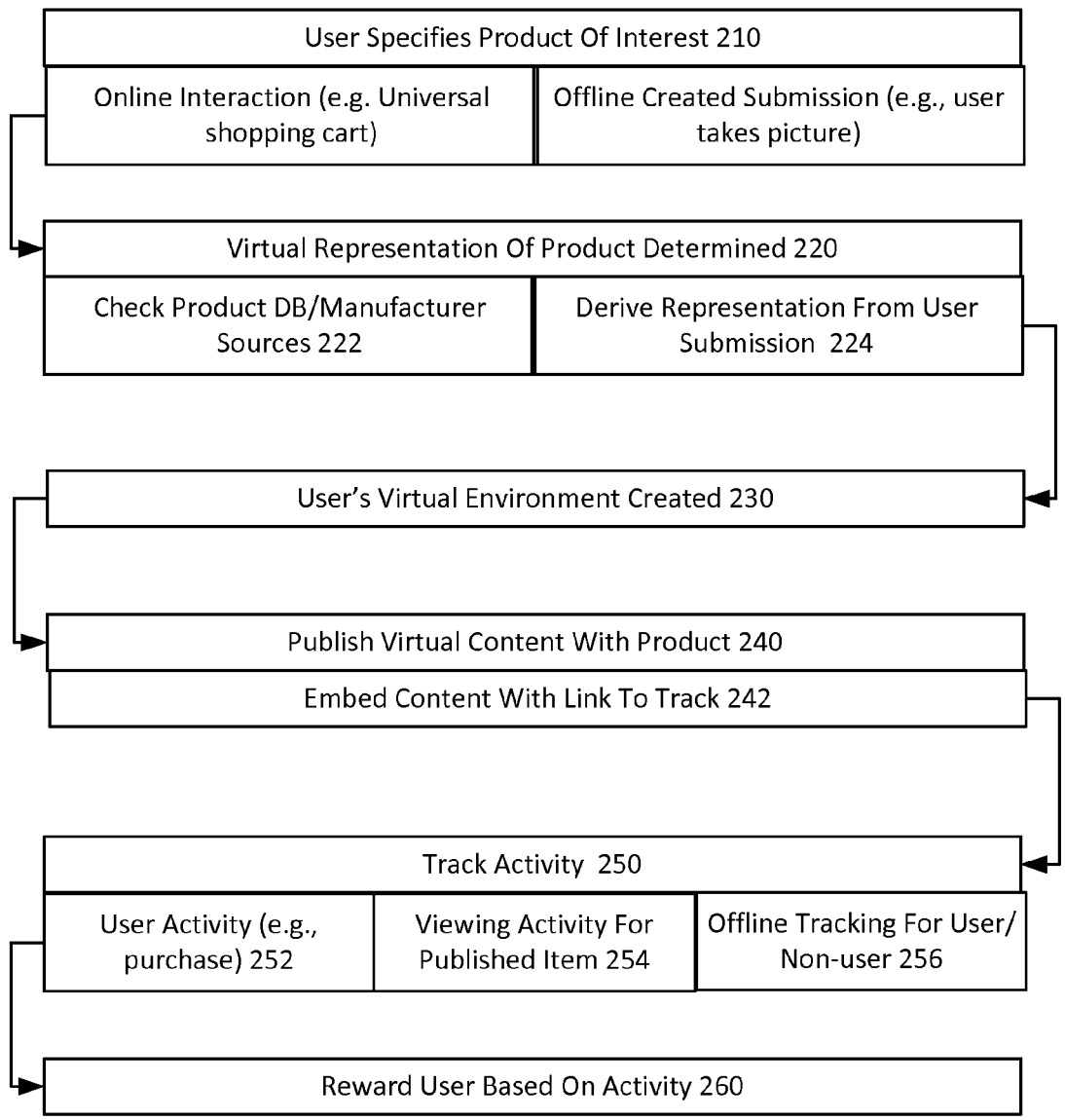
FIG. 3 shows another schematic block flow diagram for certain further aspects of the eCommerce environment and related method shown in FIG. 2.

Certain methods associated with the above are also further developed for illustration as follows. As shown in FIG. 3, a User Specifies Product of Interest 210 involves, among other potential steps, an Online Interaction (e.g. on-line environment consumer product store, as elsewhere herein described), or Offline Created Submission (e.g. user takes a picture). Subsequently, a Virtual Representation of Product Determined 220 involves checking a Product DB/Manufacturing Sources 222, and to Derive Representation from a User Submission 224. The User's Virtual Environment is then created at 230, after which virtual content with the product can be published, at 240, potentially with content and link embedded to track, such as shown at 242. The activity is then tracked at 250 and comprising the User Activity 252, Viewing Activity for Published Item 254, and Offline tracking for User/Non-user 256. A reward is then provided to the user based on activity, as shown at 260.

Further embodiments of the digital indexed virtual reality product image experience aspects of this disclosure are also provided as follows.

According to one further embodiment, the indexed virtual reality environment may also provide a diminished virtual reality, in which a consumer member using the environment may diminish an environment image within a canvas viewer by removing one or more objects from the image. Appropriate diminished reality techniques and related engines for supporting such embodiment may be similar to, or otherwise made available for such purpose, as disclosed at www.diminishedreality.com, or otherwise by "Metaio™" (www-.metaio.com) or by "Kurzweil™" (www.kurzweilai.net/diminished-reality-software-removes-objects-from-video-in-real-time). Among other benefits, this may allow a consumer member to remove an item originally shown in an environment image in the canvas viewer, in order to replace it with a new item being reviewed as imported into the same location of the environment image within the viewer.

According to still a further embodiment, product images provided for such indexed virtual reality viewing may be provided with 'green screen' or other suitable backgrounds in the respective product image, such that its imported insertion within the environment image via the canvas viewer is conducted by appropriately filling the background environment of the product image with the environment image.

According to one embodiment, an indexed virtual reality system is provided with a digital image of a product, a digital image of an intended environment of use for that product, and a user interface system comprising a display and a user input interface. At least one computer processor is also provided and that is configured in an operating mode to run a set of computer instructions stored in non-transitory computer-readable medium. According to this operating mode, a user is allowed, via one or more user inputs into the user input interface, to show the environment image as a canvas on the display. The user is then allowed to show the product image at a chosen position within the environment image on the display.

In a further embodiment, the environment image is associated with a known depth or distance to a reference object in that image, and the user is allowed to show the product image at a size dimension and depth location for the product image that are index scaled off of the reference of known size dimension and depth location within the environment image. As would be apparent to one of ordinary skill, it is further appreciated that the target objective of scaling the product and environment together may conversely be achieved and performed by instead adjusting the environment image around the product image. In any case, according to this arrangement and related method, the respective digital images of the product and environment are thus transformed by the processor and user inputs via the user input interface into a single combined, indexed virtual reality image of the product incorporated at the chosen position with appropriately indexed scale within the environment.

According to one mode of this embodiment, an object in a field of view captured by the image provides the reference, and an object range of distance in the field of view is provided for the indexed scaling. In another embodiment, the object also has a feature with a known dimension that is also used for purpose of the index scaling of the product image.

According to another mode, a product dimension tag is provided with the product image and provides a feature dimension of a physical feature of the product, while an environment dimension tag is provided with the environment image and comprising the object dimension and object range. The feature dimension, object dimension, and object range each correspond with virtual feature and object dimensions and a virtual object range of depth, respectively, and that are each scaled to a size, magnification, and viewing angle for the respective product and environment images. According to this arrangement, the user's chosen position may include a chosen depth for the product image along a reference depth axis into the environment image. In this case, the processor will typically be configured to index adjust the size of the product image at the chosen position.

Alternatively, the user's chosen position may be a chosen location relative to perpendicular reference vertical and horizontal axes in a reference plane of the environment image, and the user chooses a size of the product image and corresponding virtual feature dimension at the chosen position. In this latter case, the processor is configured to index adjust a chosen depth for the product image along the reference depth axis into the environment image.

Generally in either case, the virtual feature dimension at the chosen depth, or the chosen depth for the chosen virtual feature dimension, is scaled relative to the respective virtual object dimension and virtual object range, respectively.

According to another mode, the processor in the operating mode is further configured to allow the user to real-time adjust, via the user-input interface, the chosen position or size of the product image between multiple positions or sizes, respectively, in the environment image on the display. The processor then index adjusts the size or chosen position of the product image between multiple sizes or positions, also respectively, in response to the real-time adjustment by the user.

In another mode, the processor in the operating mode is further operable to do the following. The user is allowed to adjust at least one of a viewing angle and a magnification setting of the indexed virtual reality image, thereby adjusting the displayed virtual dimensions and depths of the product image and object. The processor then adjusts the perspective and/or size of the product image within the environment image to correspond with the user adjustment while substantially maintaining the indexed scaling between the respective virtual feature and object dimensions, while also adjusting the indexed scaling to account for different relative changes in depth and perspective for the respective feature and object over varied viewing angles.

In another mode, at least one of the digital images and known dimension associated with such image is created by a digital camera measuring application.

In another mode, a digital camera with a measuring application is provided and is used to take at least one of the digital product and environment images and associated dimension or range.

In another mode, at least one of the environment and product images comprises a 3D image.

In one embodiment of this mode, a 3D digital camera is provided and used to take the 3D image.

In certain further embodiments operable with other modes described above, a measuring application is provided with the digital camera that is adapted to measure and save a dimension of at least one object in a field of view captured in a digital image by the camera. This is used to measure at least one of the feature dimension for the product image, or the object dimension for the environment image, taken by the camera.

According to another mode, the system includes at least one database stored in a computer-readable memory and comprising an image library of digital images of multiple products including the product image. The user accesses the image library and displays the set of digital images of multiple products. The user then selects the product image for manipulation into the chosen position within the environment image canvas on the display.

In another mode, at least one database stored in a computer-readable memory includes a recallable stored record of the digital image of the environment. The user selects from the database and shows the environment image on the display as the canvas for later importing of the digital image of the product into the canvas.

In yet another mode, the user saves a record of the indexed virtual reality image in a database, and is able to later select from the recallable database and display or electronically transfer the saved indexed virtual reality image.

In another mode, the user is presented with and can activate an electronic purchase trigger to purchase the product, or a group of products such as for example via a "batch buy" as per under other embodiments herein described.

In another mode, the environment provides the user an ability to share the indexed virtual reality image with another party or within a social network (SN), and also allows the other users to view the indexed virtual reality image via the user interface system. In one embodiment of this mode, the sharing is conducted by saving the indexed virtual reality image through a common database with access provided to the social network. In another embodiment, a benefit or reward is provided to the user for the sharing. This may be for example via the vendor, or via a resource or reward system supported within the environment more generally. In one particular example, the benefit comprises reward credits applicable, e.g. redeemable, for another benefit. In another example, the benefit is a commission from the purchase price paid for the product by a first recipient party to whom the user shared, or by another recipient party who received the image as a result of further sharing from recipients of the user's sharing. It is appreciated that these aspects of SN sharing also appropriately apply similarly to other aspects and embodiments of this disclosure, whereas the SN aspects disclosed in context of those other embodiments may also similarly apply to this embodiment.

Another aspect of this disclosure provides the above referenced indexed virtual reality aspects (and other disclosed aspects and present embodiments) within a particular beneficial eCommerce environment as follows. A member interface system is provided in combination with a database system that includes a vendor member account database with a digital product image database, and that also includes a consumer member account database with a digital indexed virtual reality image database.

A vendor is allowed (and/or required, if it wishes to participate) to subscribe as a vendor member within the environment by creating and storing vendor member records corresponding with a vendor member account for the vendor within the vendor member account database via the user interface system. The vendor member then also registers the digital image and related purchase information for the product as one or more item records corresponding with the vendor member account within the database system.

The consumer user is also allowed (and/or required) to subscribe as a consumer member of the environment by creating and storing one or more consumer member records corresponding with a consumer member account for the user within the consumer member account database. The consumer member selects the product image from the digital product image database and saves the digital indexed virtual reality image it creates into the digital indexed virtual reality image database.

According to another mode of the various aspects elsewhere herein described, the user interface system comprises a web-enabled interface between a remote computer and at least one said processor. In one embodiment of this mode, the user interface system comprises a mobile computing device. In one particular example, the mobile computing device is connected to a network via a wireless connection. In another example, the mobile computing device comprises a touch screen that comprises the display and the user input interface. The user interface system may include, for example, an application that is activated via a touch icon presented on the touch screen.

In still further embodiments, an indexed virtual reality environment may also be adapted to 3D virtual reality viewing environments via 3D virtual reality viewers such that a consumer may immerse into the 3D landscape created for a more full simulated 3D experience of the indexed reality image. It is also contemplated that the 3D image of the 3D environment may comprise a composite image of multiple images electronically stitched together, as would be apparent to one of ordinary skill.

An indexed reality canvas viewer as contemplated herein may be offered and used separately from an indexed reality canvas creation platform. This may permit someone to view or immerse (e.g. 3D) into an indexed reality image created elsewhere, and/or save all or a portion of such into its own storage resource or hosted environment store (e.g. consumer product store) of the present embodiments and for potential further transactions.

Tagged Products in Media

An embodiment described above as the World Experience Point of Purchase (POP) 75 shown in FIG. 1 generally addresses real-world experiences where items available for sale are shown or otherwise included in a format presented for consumer observation, but not typically for the direct purpose nor providing an ability for the consumer to acquire requisite purchase information related to, or to initiate or conduct, a purchase transaction directly from the consumer observation. Examples of such experiences include media transmissions where products or services are included or embedded, such as for example movies, songs, television shows, or even transmitted media advertisements.

Particular embodiments provided hereunder for this current aspect of this disclosure provides tags to coincide with such item representations within such media formats and that provide, when scanned by a consumer, a product ID, other product purchase-related information, or links to such information or a point of purchase for the respective tagged item(s). One such highly beneficial embodiment tags and transmits product ID and/or other product purchase-related information with the media transmission coinciding with a representation of the item, and allows a consumer to scan the media transmission within a system enabling the consumer to access the product-related information or link necessary to initiate or conduct a purchase transaction for the item, or to save the information and/or link for a later purchase transaction, or to share the information and/or link with others such as within a social network.

Figure 4:
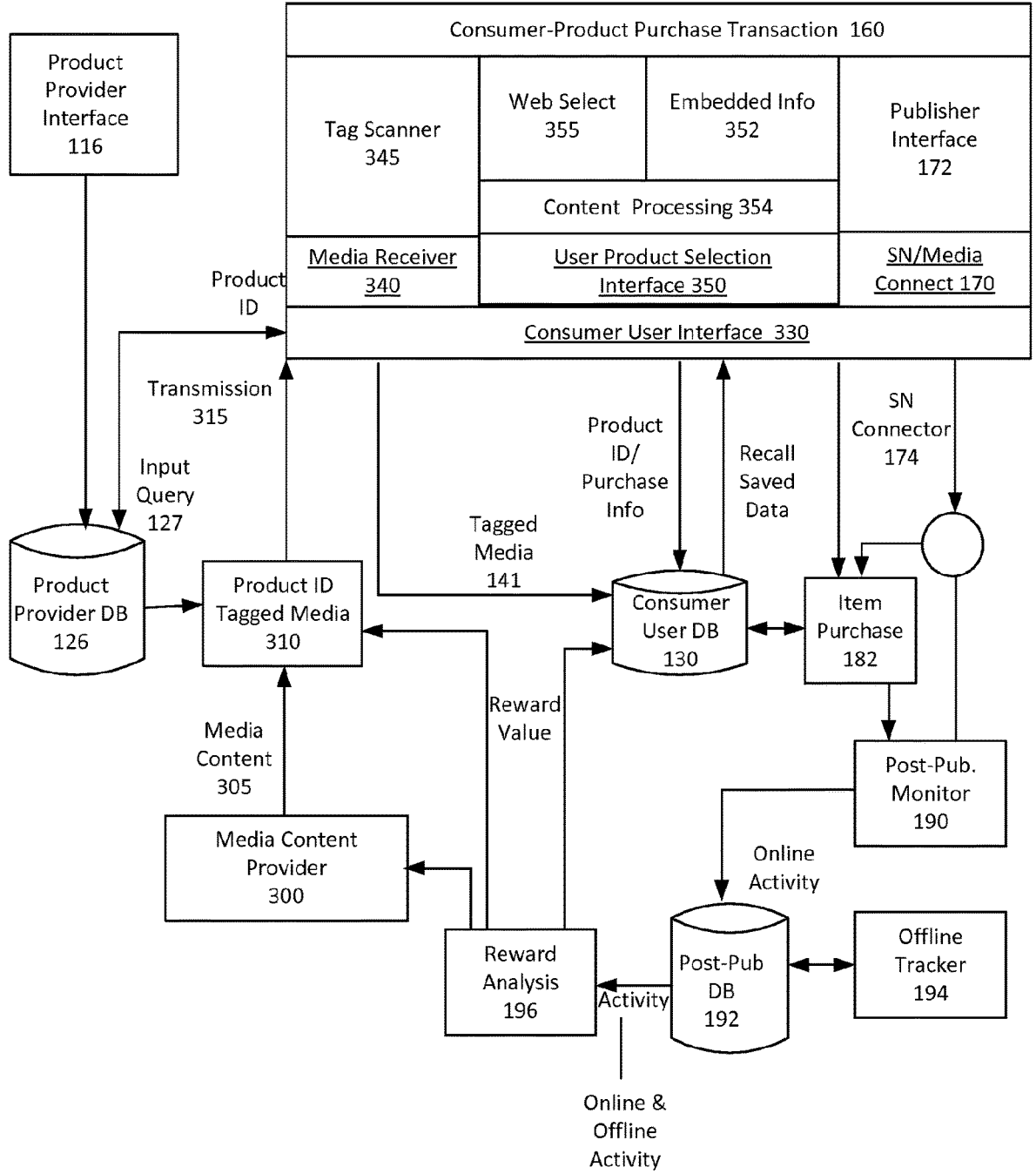
FIG. 4 shows a schematic block flow diagram of other aspects of an eCommerce environment system according to this disclosure.

A more specific embodiment shown in FIG. 4 illustrates certain further aspects of a world experience point of purchase (POP) environment shown at POP 75, such as may be provided under a similar broad hosted environment as elsewhere herein described such as eCommerce Environment 50 in FIG. 1. Components of this POP 75 environment shown in FIG. 4 reflecting similar labels and reference numbers to like components shown in FIG. 2 may be similar in nature and function for the present FIG. 4 embodiment as per their description above for the FIG. 2 embodiment, except where such components may be otherwise identified and assigned with unique aspects in this written disclosure.

FIG. 4 shows various components of POP 75 environment where products or other items for sale may be embedded in media transmissions, tagged with item-related information such as ID or purchase information (or related links), and scanned with a consumer member for potential saving, sharing, or initiating a purchase transaction as follows.

A media content provider 300 provides a transmittable media content 305 that is embedded with a representation of an item for sale. A tag is provided to correspond with the item representation in the transmittable media to provide Product ID Tagged Media 310, although such tag may include product ID information, other product purchase-related information, or other product information in general, or a combination of the above. The tag may be provided by the media content provider or product provider, such as via a product Provider DB 126 within the POP 75 environment. The product ID tagged media 310 is transmitted via transmission 315 to a consumer user interface 330 that includes a Media Receiver 340 and User Product Selection Interface 350. Transmission 315 may be one transmission with both the media and the tag, or may be separate transmissions that are transmitted in coordinated fashion to serve the intended purpose of tagging the item to a scanner of the transmission.

The consumer user interface 330 within this system embodiment of FIG. 4 also includes a tag scanner 345 that may be provided under the same device or system component as, or separate but associated with, the media receiver 340. In one embodiment, tag scanner 345 is actuatable by the consumer to scan the media transmission and capture the tag information. For example, a tagged item-embedded media transmission from a media publisher (e.g. TV network) may be received by a first media receiver 340 at or near the consumer, then processed and re-transmitted via a local media transmitter at or near the consumer (e.g. local TV resource), which re-transmission may then be received by a second media receiver 340 at the consumer (e.g. audio microphone for audio media content, or camera for visual media content). In this case, the tag scanner may be provided by or associated with the second media receiver. It is appreciated, in fact, that multiple transmissions and re-transmissions may be made, and with multiple commercial parties potentially involved, at various communication nodes between an initial transmission and reaching the point of the consumer for scanning.

The tag captured by the tag scanner 345 then enters Content Processing 354, and such that the product ID and/or purchase-related information (or POP link) may be embedded info 352 within the tag itself, or may be a link or tag info itself to another source of the desired product ID, purchase info, or POP link—such as via a web select 355 path provided by the system to the user via the user interface.

The consumer according to this present embodiment may be presented with a number of choices following capturing and processing the tag information and/or POP link, including for example initiating or completing a purchase transaction 160 upon being presented with such, or saving the tagged media or virtual content 141 itself or the Product ID and/or purchase-related info or POP link into the consumer user DB 130 for later recall and transacting. The consumer user may also share such information with other members of the environment, such as via a social network, as similarly described above by reference to the FIG. 2 embodiment and shown again in FIG. 4. It is further contemplated that there may be one or several products featured in a tagged transmission, with choices provided to the user downstream from the scan or capture point of the tag in order to either disregard or pursue a transaction for any such given product.

A reward system as also previously shown and described above by reference to FIG. 2 is also shown in FIG. 4 as similarly applicable for inclusion as a further beneficial feature under this present embodiment. In addition, it is recognized that the current embodiment comprises additional parties involved in 'sharing' the product—namely the media content provider, for example, which embeds the item for sale within the media content, and/or that same party or another party who might provide the actual product ID tag to correspond with the item representation in the media transmission for scanning. Accordingly, as also shown in FIG. 4 between Rewards Analysis 196 and Media Content Provider 300 and Product ID Tagged Media 310, a rewards system as previously describe above may also provide rewards to these parties for their contribution toward delivering the scannable tagged product embedded in the media transmission to the consumer for scanning for potential purchase (or further sharing).

Figure 5:
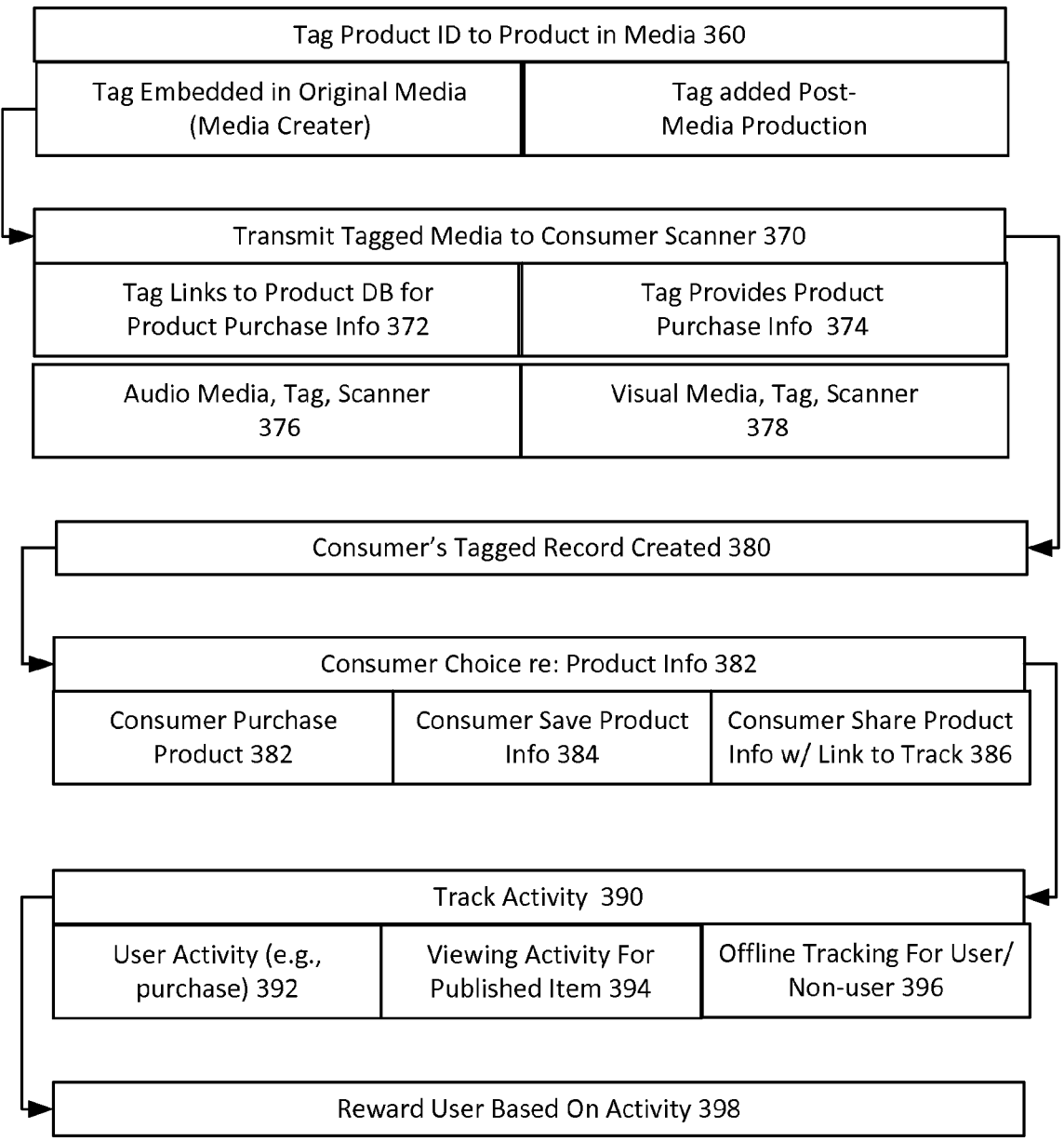
FIG. 5 shows another schematic block flow diagram for certain further aspects of the eCommerce environment and related method shown in FIG. 4.

Further aspects of the disclosure above by reference to FIG. 4 are also shown in FIG. 5 along various method flow steps as follows. A tag providing product (or "item") ID or other related information or POP link is tagged to a representation of a product or item in a media content 360, and which tag may be embedded in the original media by the media creator, or added post-media production. For example, a movie or other video production may be made with a number of products (e.g. furniture, clothing, jewelry, vehicles, etc.) included in various scenes, and with a record kept of certain such products in relation to the scenes when they are included (or more generally for the media production). The original media creator, or another party, may—after the video production is already created—later add tags to correspond with the various products or items represented.

The tagged media is transmitted to the consumer which activates its scanner 370 for capture and processing of the tag. This may entail the tag linking to a product DB for product ID, purchase information, or POP 372; or, the tag as processed may provide such directly to the consumer as shown at 374. According to one example of a tagged link, a database of products may be provided for access to the consumer user via the tag in order to find a particular item of interest among multiple such potential items in the same media transmission, or the tag may be for a particular such item itself more directly. According to one example for illustration of a direct tag capability, the user interface may present the consumer for example with a button (e.g. touch icon on a touch screen) or other indicia or ability to immediately initiate or conduct a purchase transaction. The media, item representation, tag, and scanner may be audio in nature, as at 376, or visual in nature as at 378. Or, these may be mixed. For example, a media transmission may include both audio and visual components, the item representation may be provided in either format, and the tag and related scanner may also be configured in either format (and not necessarily the same format as the product representation—e.g. a visual product representation may be tagged with an audio tag and scanned with an audio scanner). Moreover, an audio tag may not necessarily be audible. Still further, other formats are contemplated. For example, RF or other form of wireless signals may provide the requisite tag (and corresponding scanner platform format). In another example, the media transmission itself may be fully electronic—e.g. streaming video for example. In this case, the media may then be re-transmitted visually and/or audio, such as via a computer or "smart" TV and with related tags and scanning associated with that re-transmission. Or, the tag may be digitally associated with the streaming video and/or audio media itself and may be tagged within the computer-processor hosted environment. In one particular embodiment for illustration, a streaming video or audio media transmission streaming on a computer processor is embedded with a product representation, and with a tag included with or superimposed with the stream via the processor, and also with the scanner enabled on the processor itself.

In further embodiments, all tagged features (e.g. embedded products) of a given media transmission may also be accessed by a consumer user by a query for such directed at the media transmission, performance, or content therein.

In still a more detailed example, the environment is provided in a manner such that items available for sale and embedded in the streaming media transmission are indicated to the user during the transmission, such as for example in a separate window displayed to coincide with the streaming media transmission. In a further example, such separate product window may be updated during the course of the media transmission to coincide with the timing of different items embedded within portions of the transmission.

In another example, a library of items embedded and tagged for a particular transmission is accessible to a user. In one further variation of this example, a user may for example be able to access the item, and link to the portion of the media transmission where the item is represented in order to observe the item as portrayed or otherwise presented.

In still a further embodiment, a given item may be embedded in various different media transmissions, and a user accessing that item may be able to access and select the various media transmissions where the item is embedded for observation.

A number of different specific tags may be used to suit a particular intended environment of use, either to accommodate the format of the media transmission itself, or of the user interface where the media transmission will be presented to and observed by a user for scanning and capturing the respective item tags. Examples of visual tags associated with this present embodiment (and other aspects and embodiments elsewhere herein described) may include, for example a quick response or 'QR' code, 'General Specifications' or 'GS1' code (e.g. described for example at www.gs1.org), universal product code or 'UPC,' or other form of barcode (e.g. which may be optical, magnetic, or other format), that is presented in a portion of a field of view of a visual media transmission. Certain such coding conventions are proprietary and subscription based with pools of products given associated code assignments in corresponding registered databases. In certain embodiments, the environment will involve subscriptions to one or more of such pools to provide ready access to products and the associated codes within the environment for associated eCommerce transactions contemplated hereunder. Other technologies such as "iBeacon™" (commercially available by Apple Corp.), or other form of radiofrequency (RF) or other form of data transmission or communication (e.g. magnetic, Bluetooth™, other internet of things or "iOt" sensors and transmission platforms), can also be applied for the purpose of tagging and scanning products for recognition and potential purchase, and in certain applications may also be employed in a new use and system environment to suit the appropriate implementations of various embodiments herein shown and/or described.

It is also appreciated that point of purchase systems with certain 'tag' indicia such as of the types described above (e.g. QR or other form of barcodes) may be provided on actual products or static advertisements such as billboards or print material, and thus provide significant benefit to a consumer presented with such material. Such sourcing of sales items and related purchase information is contemplated within various embodiments herein as a suitable sourcing venues and formats for such items for further processing and use within those embodiments.

However, such static environments also typically target specific products as the purpose of the material itself, and differ significantly from more significant challenges of tagging products embedded within media transmissions.

In another regard, certain media transmissions may themselves be scanned within a system in order to identify the media transmission itself. In fact, such scanning may also be provided in conjunction with a purchase opportunity for that transmission. For example, a song may be received and 'scanned' to identify the song itself, including to possibly initiate a purchase transaction for that song, such as for example via SHAZAM™, a commercially available application. However, such approaches of merely identifying the media transmission itself, even with further links that might follow, does not address the different need, challenge, and benefit of identifying a product representation imbedded within the media transmission and that is itself a separate target than the media transmission itself. The needs, challenges, and benefits become still more unique and distinct where multiple such products may be presented in the media transmission.

In fact, it is contemplated as a further embodiment hereunder that such an audio recognition application including or similar perhaps to SHAZAM™ may be employed as a suitable scanner for certain implementations of the other embodiments herein described for audio-based tags and respective scanners. Such an embodiment harnesses the audio recognition capability provided by the scanner, but in a new and beneficial applied use and environment configured to capture an audio tag to identify a product representation embedded within an audio transmission and provide product ID, purchase-related information, or POP—and not for the actual audio transmission itself. Moreover, in a further embodiment, the audio recognition format is applied to capture an audio tag transmitted in combination with a visual media transmission, wherein the product representation is imbedded within the visual media transmission, and the recognized audio tag results in providing the consumer the product information required for the purchase or related purchase decision.

As further shown in FIG. 5, in certain further aspects of this embodiment the Consumer's tagged record is created (such as is shown at operation 380 in FIG. 5), at which point the Consumer has choices, such as via respective inputs into the UI, re: one or a combination of activities regarding product info (382). These include, for example, purchasing the product (382), saving the product info (384), and/or to share the product info with one or more links to track the sharing and/or downstream transactions following that sharing (386). Such activities may then be tracked (390), including for example the User's activity (e.g. purchase)(392), viewing activity for published (e.g. shared) item (394), and/or off-line tracking for user/non-user (such as for example separate direct retail purchasing which may still be linked back to the environment and respective purchasing consumer) (396). Various rewards may also be applied within the environment based on the respective activity (398), such as is also elsewhere herein described and applicable in this embodiment.

According to another embodiment of this general aspect, it is also appreciated that in certain circumstances products embedded in media transmissions or performances may be tagged by other approaches than embedding such tags within the performance itself. For example, in a streaming media transmission, an indicia (e.g. key word, which may for example be presented with a logo indicating its purpose to tag) may be presented to the consumer. The consumer can then input the word into the UI of a computing device running the respective environment 'app' and which would similarly link to the product information and/or purchasing venue as if scanned according to the other examples above. This may be beneficial for example when there is a loud environment (e.g. crowded venue) or sound is turned off of a video transmission. Moreover, to provide user flexibility, multiple forms of tags may be provided to provide options (e.g. audio and visual/key word).

It is also to be appreciated that the above embodiments are not necessary limited to only transmitted broadcasts per se. For example, a media performance may be played on a computing device from any form of source medium, e.g. audio file, video file (e.g. DVD, mpeg), etc. and may have associated tags as described above.

Moreover, in still another embodiment, a media performance may be 'tagged' via a separate source that coincides with the media as it is being performed. For example, a media transmission via a hosted system (e.g. television, web broadcast, etc.) is well registered within a system as to the timing of that broadcast. Merely recognizing the timing of the product interest, to coincide with the timing of the transmission, can link to the product information. In one more specific example, the portion of the media performance that is scanned can be recognized for its contents, including the product that can thus be identified and linked (e.g. without any other associated embedded tags). In another example, merely indicating what channel is being watched and providing a user input at a particular time can be registered to the coincidental timed portion of the media transmission, which is thus used by the system to identify the product(s) embedded therein.

Still in further embodiments, it is also recognized that a user may not necessarily be required to initiate a scan via a user input in order to receive a product tag from a respective media transmission. While the 'app' is activated and 'live' on an appropriate computing device, it may be configured to actively recognize when scan points occur in a media transmission that is being performed (or be triggered into scan mode when a tag is transmitted). This approach may allow the consumer user to be more passive, and merely view the UI display of the computing device running the app in order to see what products are being featured. A user input may then be provided when a particular product of interest appears as tagged and featured. Still further to this embodiment, the consumer app may store a cache of such embedded products into the consumer user's account for later review and either discarded or saved into the consumer product store (see below). Any or a combination of these above embodiments may be provided via the app for the consumer user as options, and who may choose which option they wish to operate under at a given time (or user profile set by that consumer). Moreover, such options may be made available only at certain levels of membership in the environment (e.g. lower level for one cost, or free, with more features that can be added as 'pay for' options under the consumer member's account).

Consumer Product Store

Figure 6:
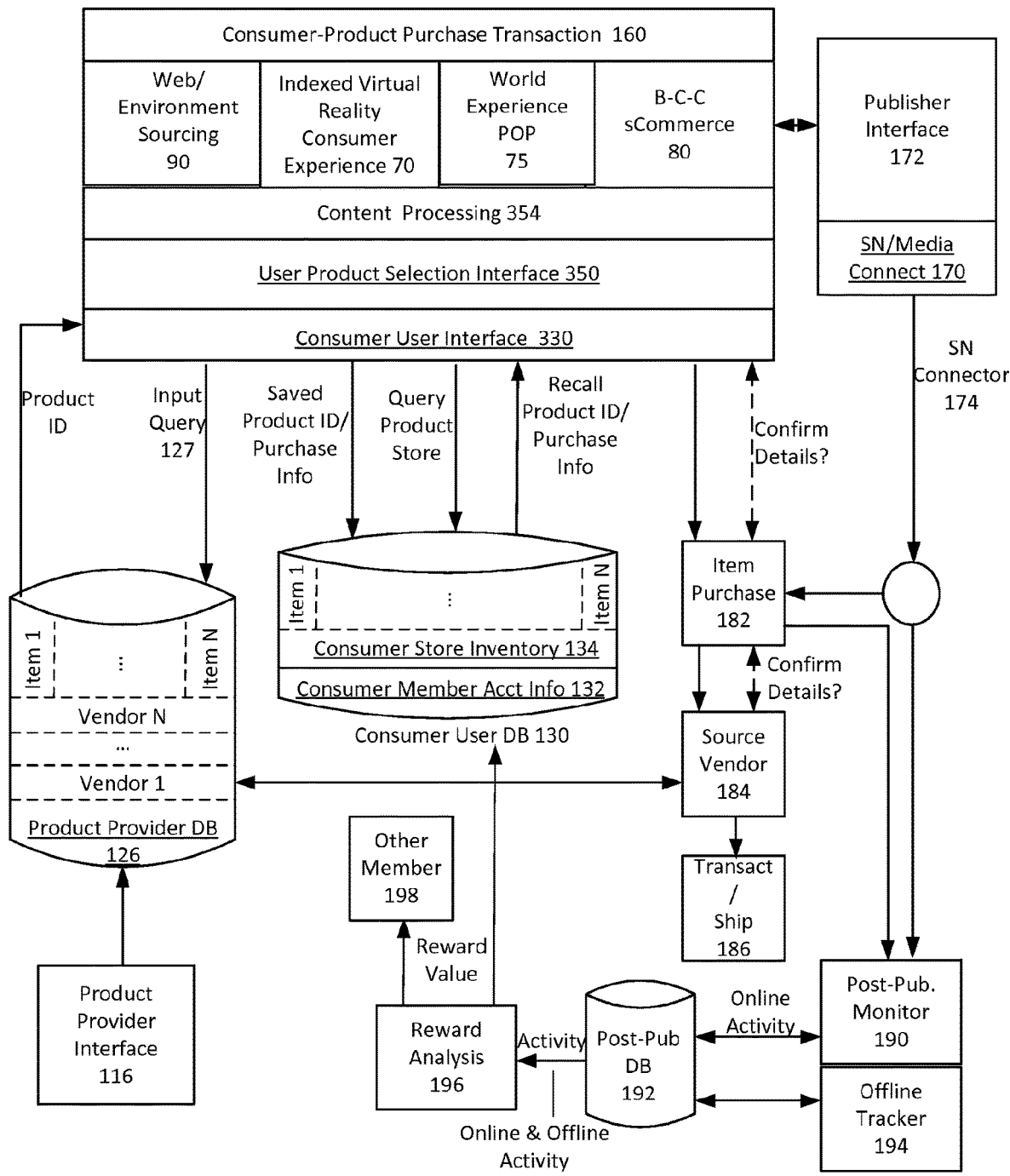
FIG. 6 shows a schematic block flow diagram of another aspect of an eCommerce environment according to this disclosure.

As introduced above, according to an additional aspect of this disclosure, the environment 50 (e.g. as shown in FIG. 1, and thus also incorporated herein to this embodiment as well by reference) also provides an ability for consumer members to create their own consumer product store 85 as an environment that, among other benefits, virtually replaces and obviates the need for conventional on-line 'shopping carts' typically provided by product vendors for consumers to source and purchase items electronically on-line. It is appreciated according to embodiments herein described that a full circle of transactions such as purchasing, saving, sharing, selling items are available in the eCommerce environment for items featured for consumer product store inclusion More specifically, as illustrated in FIG. 6, the consumer product store 85 environment allows a consumer member to create its own inventory as its own store of items for potential purchase that are saved by that consumer member as a "source consumer member" in a consumer user database 130 corresponding with its respective consumer member account 132 and as a consumer store inventory 134. This consumer store inventory 134 is maintained off-line for later on-line access by the source consumer member.

The consumer product store 85 environment provides a consumer user interface 330 that may be otherwise similar to that provided for other embodiments previously described above, and in fact may support multiple of the present embodiments. Interface 330 allows a consumer user to source such items for its respective customer inventory from a number of different origination sources. For example, as shown in FIG. 6, such items may be derived from other aspects of the present embodiments in this disclosure, such as for example via Indexed Virtual Reality Consumer Experience 70, World Experience POP 75, or sharing via B-C-C sCommerce 80, as further described elsewhere herein. As shown at Web/Environment Sourcing 90, the items may also simply be sourced via a browsing capability provided within the environment to browse, search for, or otherwise find items generally via the web, or as may be otherwise provided by registered vendor members of the environment via Product Provider Interface 116 into Product Provider DB 126 (or otherwise 'captured' by the consumer member for saving into its consumer store). This sourcing may be accomplished, for example, by the consumer member inputting an Input Query 127 via the interface 330 to read or view a product ID and/or other information such as a product image or rendering, product purchase information, etc. The consumer member can thus access one or more such items, such as for example item 1 through N shown in FIG. 6, and save one or more of them into the consumer member's own consumer store inventory 134. It is further appreciated that the consumer member may also conduct other operations with the originally sourced item, either prior to saving such item or after recalling such item via the consumer store inventory 134. This includes, for example, evaluating the item via Indexed Virtual Reality Consumer Experience 70, and either then save (or re-save) the item itself (or in this specific example, save the item as embedded within the indexed virtual reality environment).

It is also appreciated that the consumer member may also save such items within its own consumer store inventory 134 along with other information provided by the consumer member regarding the item (e.g. comments about the item, or sub-folders or other forms of organization or categorizations that a user may assign to items, or groups of items, within the environment).

After saving items to the consumer store inventory 134, the consumer can then later recall the item and choose to initiate a purchase item 182 via an electronic purchase transaction 160. The actual purchase transaction itself may take a number of different transactional paths. In a highly beneficial embodiment however, at the time upon saving the item into its consumer store inventory 134, a consumer member can be aware of and agree to all aspects of a purchase transaction for the item (e.g. price, shipping etc.), and all consumer purchase information (e.g. payment vehicle, credit card info, shipping address, etc.) may also be already available for that consumer member within the consumer member account info 132 of the consumer member DB 130. In this circumstance, the consumer member can complete the full purchase transaction via a single click (or 'tap' in the case of touch screens for example), e.g. via a "buy now" or prompt and input of similar purpose. In another further embodiment, the consumer member may save the item with some purchase contingencies that will initiate, and/or complete, the purchase. This may comprise, for example, a preset date (e.g. someone's birthday, or based upon expected income/paycheck/bank balance etc.).

In yet a further embodiment, such contingencies may include 'strike terms' at which the consumer member may be willing to buy the item. For example, the item may be initially sourced and stored as available from a particular vendor at a particular price (and/or delivery terms), and/or number of vendors within a range of such. The consumer member may store the item into the consumer product store inventory, but tag it to the member's own defined terms at which the member is willing to purchase the item. Vendors are given access to such 'contingent purchase tags' in the consumer's product store, and an opportunity to offer the item at the defined contingency terms.

The embodiment immediately above represents an example of a broader further aspect of the consumer product store, wherein vendors are able to access and use this information to provide offers to the consumer member related to that person's inventory of potential purchases (and related terms). Whether or not contingency terms are provided by the consumer member, knowledge that the member is interested in purchasing provides a powerful platform for informed, consumer-specific targeted sales. This essentially may manifest, in some embodiments, in a reverse auction environment wherein vendors can compete for best price/terms to the consumer member.

Other embodiments also contemplate pooling consumer members together within the environment as a syndicate in order to bundle together bundled purchases, which may in certain circumstances provide sufficient buying power to drive and/or negotiate bulk discounts in pricing or other advantageous terms. This may be done by the voluntary connections and actions between the consumer members in pooling together, and/or may be facilitated by operations provided by the at least one computer processor hosting the environment that connects such consumer members together via their similar or related saved items in their respective consumer stores. Similarly, such environment host operations may be applied to pooling or otherwise syndicating together vendors for their respective benefits in conducting their side of eCommerce transactions facilitated and/or conducted within the environment.

Additional embodiments herein contemplated also provide other information in conjunction with the saved product store. This includes, for example, recording biometrics during a shopping experience (and even more specifically while viewing and saving a particular product). This may be accomplished, for example, by certain sensors (e.g. heart rate, temperature, etc.) provided with wearable computing devices (e.g. watches).

Further aspects regarding vendor initiated offers within the environment to consumer members are also described elsewhere herein. Upon a consumer member initiating the item purchase 182, the environment engine may then conduct a number of different operations. In one embodiment, the engine may notify and prompt the consumer member with purchase terms (e.g. price and delivery terms) to confirm the purchase (e.g. which may be via a subsequent "click" on such button or other indicia provided for such confirmation input). In another embodiment, the engine compares the item's purchase information at the time it was saved, against its purchase information at the time of purchase. If something has changed, e.g. price or delivery terms, the engine informs the consumer member of the new terms and for confirmation the consumer member still wants to purchase, or to cancel the purchase per the new terms. In still a further embodiment, a consumer member can choose a range within which a purchase term may migrate and the consumer member will still wish to purchase the item (e.g. limit on % increase from the original purchase price). In the event a change is identified from the original terms, but within the range, the purchase transaction will still be completed via the original order without requiring confirmation.

It is also contemplated that a particular item featured within this environment 85 may be made available for purchase from a number of different vendor members of the environment. In an additional embodiment, the environment engine conducts a source vendor 184 operation in response to the consumer member's item purchase 182 input and to conduct the transaction and ship (where indicated) the item to the purchaser (as shown at transaction/ship 186). This can be fully or partially transparent to the consumer member, rendering the transaction product-centric—and vendor agnostic—for the consumer member. In fact, even the original item sourcing from product provider interface 116 and resulting from a query 127 may be vendor agnostic and/or transparent.

It is also contemplated that the respective eCommerce environment may comprise a number of different source vendor members for a particular item subject to an item purchase 182 input from a consumer member. In this case, a decision between such vendor members for a respective item purchase may be made by the engine supporting the environment itself. Such decision may be based on certain criteria that are either default criteria within the system or set by the consumer member. Such criteria may include, for example, lowest price, fastest shipping, or preferred vendor members (e.g. as preferred by the consumer member, or by metrics assigned by the environment administration), or a combination of such metrics. In the alternative or in addition to such filtering by the engine, the engine may present multiple vendor members identified via the sourcing for the purchase item to the consumer member for his or her own choosing.

According to another consumer store environment embodiment, a consumer member may also bundle or 'batch-buy' multiple items at one time as a bundled instruction to the engine, such as for example by clicking or tapping, dragging or swiping, or otherwise identifying with user inputs, multiple items as a batch or bundle and then inputting a batch or bundled purchase instruction. The transactional mechanisms described above for the environment engine may then apply for each item (or all at once) under the bundled purchase transaction, while certain particulars may potentially vary between specific items in the batch (e.g. if one item's price has changed since originally saved in the consumer store inventory 134, it may be flagged for confirmation prior to initiating the purchase of either that one item in the batch, or of the full bundle—such as for example when multiple different items may relate to each other, e.g. separate furniture that are intended to be used in the same room in a coordinated interior design plan). It is further contemplated that certain combinations of products may be selected within a batch buy, with other products not included (e.g. as not selected, or specifically "de"-selected from the batch from a source listing of multiple products). Moreover, such batch buy mechanism may also be leveraged by the engine supporting the environment to achieve bundled pricing discounts—such as if certain items, though sold separately, are all available from a particular vendor a bundled pricing discount might be available under certain agreements with vendor members choosing to participate within the environment.

In furtherance of the above aspects, bundling discounts for consumer product store inventory items can be vendor initiated. For example, a vendor (or broker of vendors) having access to a consumer member's product store inventory might be able to optimize a 'bundled' offer of multiple products together—and which may provide a unique flexibility in configuring such bundles for discounted offerings and/or otherwise for optimal capital efficiency (both for the vendors, and the consumers). In one more detailed example, N different vendors may overstock N different products that are all in a consumer member's product store—and which may be bundled together by a reseller brokering those products together to the consumer member at bundled discount price (retaining certain margins for both the broker, and vendors). Or, the vendors can network directly together to leverage their respective products for bundled discounting shared between them. In yet another example, a vendor may have multiple products in the consumer member's product store, but one or some having higher margin than others (or otherwise being more motivating to sell, e.g. overstock, antiquated model, etc.). A bundled offering may translate to leveraging a discount on one item to combined purchasing with other items.

As illustrated by these foregoing embodiments, and applicable to other embodiments elsewhere herein described, the consumer product store 85 environment allows a consumer member to populate an inventory within his own store of items that he is exposed to within various walks of life. While this may occur via the product sourcing provided by the particular embodiments of this disclosure, it may also include other product sourcing including in retail environments and thus entering the product into the environment. Product information, including purchasing and other information, may be thus captured into the environment and under a consumer product store (or otherwise utilized, e.g. SN sharing etc.) using numerous approaches as would be suitable for the intended purpose of the embodiment as apparently to one of ordinary skill. For example, visual or otherwise recognizable tags may include a quick response or 'QR' code, 'General Specifications' or 'GS1' code (e.g. described for example at www.gs1.org), universal product code or 'UPC,' or other form of barcode (e.g. which may be optical, magnetic, or other format), that provided with or otherwise tied in the context of the consumer to a desired product being captured. Other technologies such as "iBeacon™" (commercially available by Apple Corp.), or other form of radiofrequency (RF), Bluetooth™, other internet of things or "iOt" sensors and transmission platforms, magnetic platforms, or other form of data transmission or communication accessible by an appropriate sensor or scanner, can also be applied for the purpose of tagging and scanning products for recognition and potential purchase according to these various aspects and embodiments disclosed. Still further, exposures to products via general web browsing (whether within or outside of the environment) may also be enabled for product capture and download, saving, sharing, or purchasing via a consumer product store within the environment. In yet still Furthermore, products (or their proximate environments in which the products are registered) may be configured to transmit product information to a consumer member's respective mobile computing device used to host the environment app. This may include for example text or other form of electronic messaging, audio cues (e.g. Siri™), and/or radiofrequency (RF) ID tag transmissions.

By maintaining this store on his or her own behalf within his account in the environment, the consumer can thus save his 'likes' or 'interests' for later recollection at later points (and/or within consumer-defined contingency terms) of purchase. The consumer member is then able to initiate such purchases from its own personal store, without requiring or using any 'shopping cart' of any vendor for the item (and in certain embodiments, without directly dealing with the vendor at all). The consumer member may also then allow his consumer product store to be targeted by vendors for advantageously targeted single or multi-product discount offers. This thus allows the entire consumer experience to be product-centric, built around the consumer itself, vs. vendor-centric. Certain embodiments also allow "buy now" opportunities (such as for example via a single click, touch, or other form of input) for the consumer member that are both time-shifted and location-shifted away from source exposure to the item as made available by a respective vendor to the consumer member.

In addition, these various consumer member benefits are also met by certain distinct benefits for vendors too—for example by providing well defined targets for presenting offers to consumers (and which may or may not be 'informed' for optimized discounting and/or bundling) who are already known to be interested in purchasing those particular products.

Figure 7:
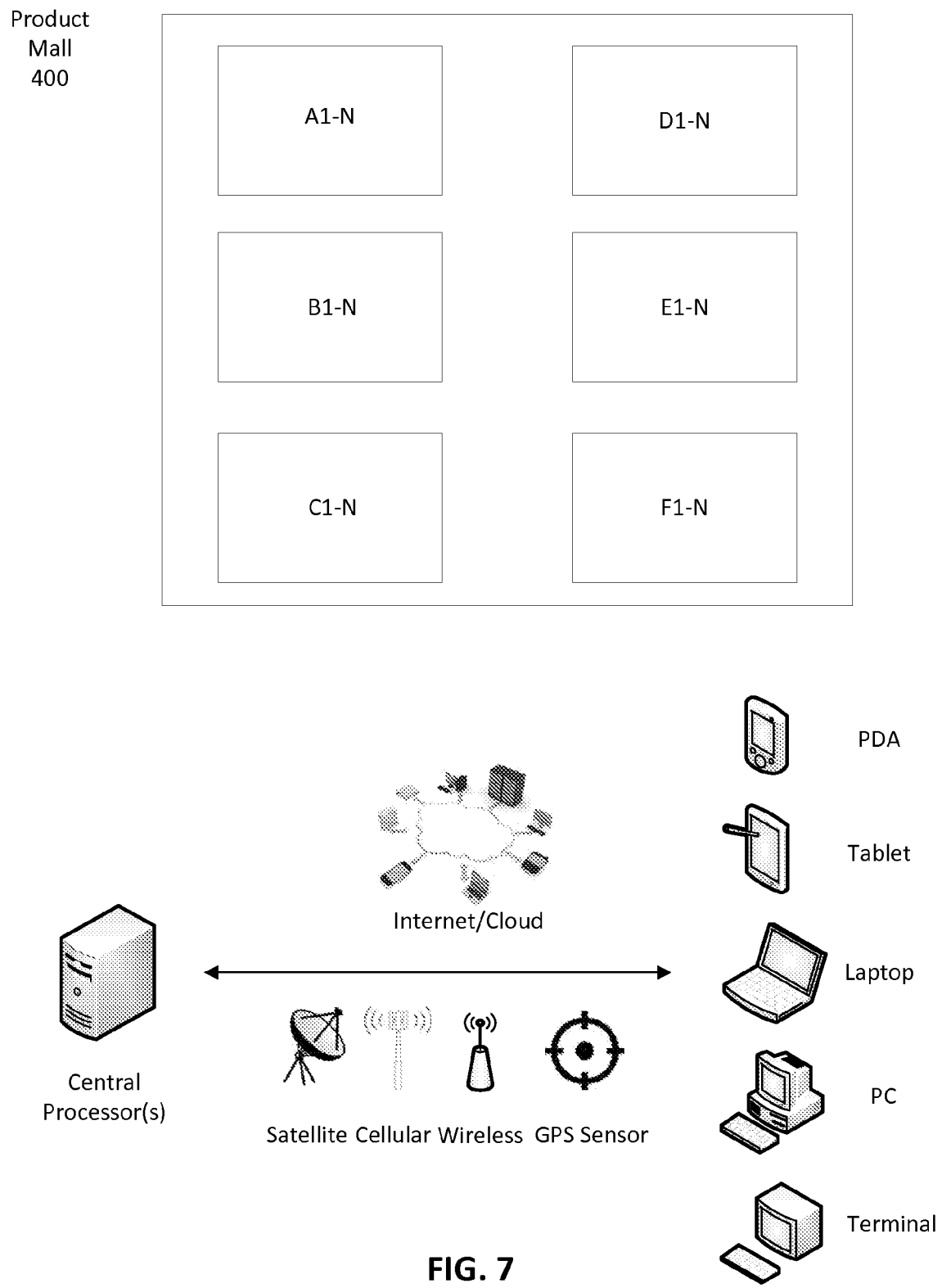
FIG. 7 shows a schematic diagram of an eCommerce environment according to another aspect of this disclosure.

Another embodiment is also described by reference to FIG. 7 as follows. A product mall 400 is shown to include stores A-F which carry products designated as A1-N, B1-N, and so on, respectively (wherein each "N" is not necessarily the same number of products). A consumer member may browse through the mall and capture various products from one or more of the stores into the member's product store. This may be accomplished by scanning or otherwise electronically capturing and recognizing unique product id tags provided with the respective products, or browsing and capturing the product offerings in an electronically hosted environment concomitant with being at the product or otherwise in the store. Via wireless connectivity between the consumer member's computing device and the respective hosted environment including the stores as vendor members (e.g. as shown lower in the FIG. 7), these respective vendor members are informed of these respective product captures by the consumer member. Prior to leaving the store, the consumer member may initiate a purchase transaction for one or a bundling of the products previously captured. Or, the consumer member may leave the store without initiating any such purchase.

Certain aspects described immediately above are exemplary of a broader aspect of this disclosure wherein vendors may provide offers to consumer members related to saved items (or similar items) in their respective consumer product stores. In addition to other descriptions provided elsewhere herein related to such aspects, it is contemplated as well that the environment may permit vendors to provide promotions or offers regarding such saved items (and/or related items) to the respective consumer member. Such vendor 'pushed' offers may include their own indicia or ability for consumer member inputs or responses in order to conduct a transaction related to such vendor offer—such as for example purchase, save, share, or re-sell (including, e.g., one-click or one-tap 'buy now' transaction, or otherwise). In these, and other regards, such vendors may provide such communications (incl. offers, promotions, or otherwise) directly to the consumer member, or tie such to the product or item itself within the product database of the environment which then translates over to the consumer member having saved that product or item within their respective consumer product store (and/or may be available to the consumer member upon 'browsing' or otherwise viewing such product or item prior to saving it in the environment).

The connectivity of the store vendors to the consumer member's captured products into the consumer member store provides a number of distinct benefits. In one regard, the vendor's ability to know what products the consumer member is capturing for potential purchase can help direct the most appropriate customer service real-time to the consumer member to assist or prompt along a 'like' to conversion into a completed sales transaction. Moreover, a real-time ability to offer discounts to the consumer member is also provided via a 'pushed' offer from the vendor member to the consumer member's app. This also may include bundled discounting offers, as well as additional products offered into such bundling that the consumer member may not have previously tagged or saved into the consumer member's store. Moreover, such bundling may be offered in a syndicated fashion between multiple vendor stores regarding their respective products found in the consumer member's product store (and potential revenue/ profits splitting between them).

This also provides a potential opportunity for other vendor members to compete for a sale. By accessing the consumer member's captured products, competing offers may be made prior to the consumer member initiating a purchase transaction. While this feature may compete against vendor members wishing to participate, other revenue sharing features that may flow from a final purchase back to an originating vendor member who first exposed the consumer member to a product may provide supplemental revenues back to the original vendor source despite not making the final sale.

In still a further embodiment, location tracking of the consumer member (e.g. via wireless, cellular, or otherwise global positioning system or "GPS" tracking) may also be deployed to monitor the consumer member's location relative to the shopping experience and progression. This may also assist the host vendor member store in directing sales assistance to the consumer member. This may also help monitor the consumer's location relative to the items initially saved into the consumer member store, including recognizing when the consumer member may have left the area without completing a purchase of the saved item(s). This may also prompt an ability to launch an offer from the vendor member to the consumer member in order to consummate product sales that might otherwise have been lost.

It is appreciated that the Product Mall 400 described above and shown may be an actual product mall, e.g. with multiple retail stores, as described. However, the aspects of the embodiments described above may also similarly apply to a single store as the 'product mall' and with multiple departments for example as the 'stores' within the mall. In still other regards, the framework of mall and stores therein may also be applied figuratively, in the sense that the 'mall' may be a hosted electronic environment where shopping between multiple vendor sources may offer products (e.g. web/internet), and the 'stores' may be multiple vendor or product brokerage websites or environments hosted via the web.

In still another further embodiment, the consumer product store, and the consumer's location (e.g. via GPS), may be accessed by vendors in a combination mode such that the consumer member may be 'pinged' under the environment by vendors offering products for sale that are saved in the consumer member's product store, and who are located geographically close to the consumer. For example, a feature within the consumer member UI may allow that consumer to poll the system at any time regarding what products in that member's product store are available for sale, at what terms, within a desired geographic range around that consumer's location at the time. Or, such information may be pushed to the consumer member's computer hosted app (or stored into or cached for voluntary consumer access into some memory). In this latter embodiment, for example, a consumer driving down the road might receive a message (either as hosted directly within the environment, or otherwise via the environment but also using another messaging platform such as texting, email, etc.) that a product in its consumer product store is available at a particular store he/she is driving nearby.

In further embodiments of various aspects herein described, the respective environment is configured and operated to use open standards for authorization ("OAuth", e.g. as described for example at https://en.wikipedia.org/ wiki/OAuth) and application program interface ("API", generally a set of routines, protocols, and tools for building software applications and that specifies how software components should interact—used for example when programming graphical user interface (GUI) components). These are leveraged, in certain such embodiments, to connect the various transactions (e.g. saved item sharing, advertising, vendor offers pulled or pushed for saved items in consumer product stores etc.) of consumer members within the environment to other environments such as separately hosted social networks. These however may also be accompanied by certain filters or protocols of the host environment to control or limit certain communications, security considerations, etc.

In general summary, the various detailed embodiments described above provide a powerful and disruptive environment in which consumers and their potential product purchasers are much more directly, and efficiently, connected to the vendors of those products in order to maximize the capital and other resource efficiencies of converting product 'likes' for potential purchase into actual product purchases. These benefits are provided, in one regard, by configuring the environment around the products themselves—in many aspects vendor agnostic—which allows the buy (consumer) and sell (vendor) side of ultimate transactions around those products to be optimized. Various such embodiments are thus also transformative regarding how consumer members shop for products, and how vendors target product offerings to convert likes into sales, such as for example in malls or other multi-vendor product offering environments (either physical, or virtual via the web) and with more efficiently enhanced e-Commerce transactions and related computing efficiencies. For example, inventories of saved items in consumer product stores and sales items offered in vendor product stores are saved within the same database system (although perhaps different portions of it), and within the same managed eCommerce environment. This provides for optimally efficient matching of purchase desires and sales offerings within that environment, and versus the often prolonged and tedious repetitive browser based 'search and find' approaches more traditionally used within conventional internet/web platform. By further tying various such embodiments to consumer and vendor locations, such as via global positioning system (GPS) tracking, further improvements and efficiencies are also thus achieved connecting consumers wishing to purchase specific products to the closest vendors of those products (and visa versa).

Business-to-Consumer-to-Consumer (B2C2C) Social Commerce (sCommerce) Environment, System, & Method By providing consumer members with this capability of creating their own item stores with their own item inventories from which purchase transactions can be initiated and conducted, it is also appreciated that a social commerce (sCommerce) network environment may also be provided in which consumer members as 'source consumer members' may share their respective stores (or identified portions of item inventories within them) with other consumer members as 'recipient consumer members', and either further evaluate or purchase such items from other members' respective stores as they might from other sources of items for sale. According to this environment, such source consumer members become integrated within the supply chain of the item itself. This augments the reach of items for sale to target purchasing consumers via social networks. Among many other benefits, this environment thus enhances business-to-consumer (B2C) targeted product marketing and advertising by leveraging certain consumer-related similarities that might be found under social network groups that are defined by people inviting others to be grouped or 'follow' each other.

It is appreciated that items shared under these present embodiments may be initially sourced from various walks of life, including as elsewhere herein described with respect to stocking a consumer product store with saved item inventory. In certain embodiments, such products or items of the consumer member itself may be shared to others according to these current aspects, either via their respective consumer product store or otherwise. For example, a consumer member may save a picture of his living room, or himself, into his consumer product store (or other hosted 'store' for sharing). Certain products or items featured in the picture may be tagged by the consumer member (or by image recognition or otherwise) to the product such that they may be linked via consumer members who are recipients of the sharing to conduct their own respective transactions with respect to such tagged item. Such sharing (per this embodiment or others) may be performed within, or outside of, social networks. As described according to further embodiments, rewards may be provided back to the source (or subsequent) consumer member who shared the item ultimately resulting in such transaction (e.g. purchase).

It is also appreciated that the broader eCommerce Environment 50 provides a number of opportunities for sharing of items between consumer members of the environment, including outside of the consumer member created stores described immediately above. For example, any opportunity in which a consumer member observes an item within the environment may be an opportunity for that consumer member to flag that item for sharing with one or more other consumer members, either directly or indirectly, such as for example via a social network supported within the environment.

According to an embodiment of this aspect, an electronic consumer-to-consumer (C2C), and which may be initiated by a business-to-consumer-to-consumer transaction as B2C2C, social network commerce (sCommerce) environment is provided in which products and/or services (collectively 'items') of subscribing vendor members of the environment may be made available for purchase, or reviewed for potential purchase, to subscribing consumer members of the environment. A consumer member may register, in an account corresponding with that consumer member of a C-C sCommerce database, one or more such items as being associated with that consuming member—such as for example to indicate that the registering member likes, supports, recommends, is considering purchasing, or has purchased, the item. The registering member may then share such registered products or services with other subscribing consumer members of the environment—such as either by 'pushing' such registered items to other consumer members, or by providing such other consumer members access to the registered products, such as a source consumer member sharing access to its respective consumer store inventory to other consumer members (as described above).

According to one further mode of this aspect, the sharing of items from one source consumer member to one or more other recipient consumer members is tracked and recorded with a sharing record stored in the C-C sCommerce database. Certain benefits or rewards are also provided for a given source consumer member. Examples of such benefits or rewards may include points or credits, such as under an account (e.g. eCommerce bank card) with credit or currency purchase power (i.e. 'fiat currency') that may be applied or redeemed within the environment itself, or outside of the environment. In an embodiment, a reward to a source consumer member who shared an item is provided as a discount price for that source consumer member for that item. Or, in another embodiment for further illustration, general purchase credits may be provided and redeemable for any item purchase (or pre-defined category of item) purchased within the environment. Such rewards may be based, for example, on percentage commission on item purchases that are made downstream from a sharing by the source consumer member. These may also be spread across multiple consumer members who might have shared an item in a thread leading ultimately to a purchase, such as shown in FIG. 6 at Other Members 198. In a further embodiment, such reward system may be analyzed and implemented for example in a weighted or sliding scaled fashion and structure, with higher rewards provided to the source consumer member who most closely and directly shared with the recipient consumer member who made the purchase, and lower rewards to interim consumer members who merely passed along a prior sharing. In another embodiment, an originating source member may also have more rewards than interim source members merely passing along a sharing, as despite being potentially further removed from an ultimate purchase, the thread that lead to that was nonetheless started at that member.

Moreover, tracking of sharing and purchase patters within such a social network may also assign consumer members with scaled 'grades' or 'levels' within the environment that may affect their status or standing within the environment. E.g. a consumer member may be a 'gold' or 'platinum' or 'bronze' based on number of rewards earned, and which status may related to different benefits (or restrictions) for that consumer member related to its capabilities and interactions within the environment.

It is to be appreciated that such weighted reward system, such as noted in such embodiments above, may provide certain incentives such as, for example, to initiate a sharing thread for an item, and/or to more aggressively advocate an item being shared to a recipient to purchase the item, and/or just to generally share more items.

Additional Embodiments

Further aspects and more detailed embodiments of this sCommerce environment and related system and methods are elsewhere herein described, such as for the disclosure referencing to FIGS. 2-7—and incorporated to apply similarly here for this portion of the description.

Certain embodiments herein described provide an enhanced eCommerce environment as a social commerce (sCommerce) environment for harnessing interplay within social networks as a means for promoting and carrying out commerce with respect to items of high commercial interest by the general public and others.

Certain present embodiments also provide environments and related systems and methods that employ a product database having, for each item available for sale within the environment, all a consumer member of the environment needs to make a purchase decision and start the order process from a first exposure to an electronic representation of (or electronic tag related to) a product.

In certain modes of certain embodiments, it is to be appreciated that a buyer can acquire (e.g. download or otherwise install) a software-based 'app' for a computing device, and enter a purchase trigger by scanning a printed code associated with a product representation in a form of media exposed for observation by the consumer. In certain regards, this may be conducted from a print ad. However, in other regards it may be conducted in relation to a product representation provided within a media transmission, such as for example capturing and recognizing an audio tag or 'snippet' (e.g. portion of a transmission) from radio, TV, or a motion picture and associating the tag with the embedded product. According to still further modes, the trigger may also be acquired during social media interaction between parties, such as for example by active or passive sharing of saved information within linked members of a social network. In still further modes, such triggers initiate a sequence placing an item on order, debiting an account, and shipping the item as a "one-click" (or 'tap' in the case of touch screens for example) transaction. However, in still further embodiments described, certain such steps may be presented to the user following a purchase process initiation in order to ensure and confirm the consumer user has all information necessary to complete the purchase decision and related transaction.

In still further aspects of this disclosure, an environment and related system and method provides for user graphical perspective design and arrangement of items for sale. Among other benefits, when a collection of items being reviewed satisfies a buyer, the entire group of items may be placed on order, billed and delivered (even though from different vendors), in one batch purchase (although an option for a series of separate purchases may also be provided as appropriate in certain circumstances).

Certain descriptions provided herein relate to initiating or conducting purchase transactions. It is to be appreciated that such may be an immediate one-click purchase (or 'tap' in the case of touch screens for example)—e.g. a price and/or delivery terms may be presented to the user/consumer to immediately choose and complete purchasing via a pre-established purchase account linked to the consumer's account via the environment. In other embodiments, however, a purchase transaction may also be conducted via multiple consumer member inputs. According to one such further embodiment, the consumer may be presented with the product and an ability to initiate a purchase transaction, but then be presented with product price and/or delivery terms to confirm the choice. Moreover, the consumer may be presented with either option noted immediately above, but then be prompted to enter payment information (e.g. credit card, electronic credit/debit/redemption accounts, etc.).

Certain descriptions provided herein also reference monitoring of consumer activity, such as for example via a "Post-Publication DB" referenced in certain Figures in relation to sharing between consumer members under an sCommerce ecosystem provided and supported by the environment. According to a further embodiment, and which may be implemented under and in combination with other embodiments herein described, other product-related purchases and activities of the consumer members themselves are also tracked. Such activities may include, for example, accessing and reviewing products within the environment, sharing between consumer members (as already described above), and/or product scanning or otherwise saving into a wish list (such as according to consumer product store embodiments elsewhere herein described). Such tracked data may be stored in a database managed within the environment, and for monitoring and identifying trends and practices that may be generalized across the consumer members of the environment, or across the vendor members and/or their related products, or may be more specifically linked to a particular consumer member, group of consumer members (e.g. within a social network or otherwise), vendor member or grouping of vendor members (e.g. within a category), product or group of products, geography, or other commerce-related metric related to consumer-product trends and activities (e.g. age, gender, pricing, timing etc.).

While various embodiments are herein described by reference to one or more 'products,' it is further contemplated that such embodiments may similarly include and apply for certain services or other items (e.g. collectively "items") available for sale. In a further regard, the various current embodiments are herein described by reference to images or other sources of information related to such products or other items for sale. It is to be appreciated that such item-related images or other renderings may be captured and/or otherwise made available in a number of different ways and which are still contemplated within such embodiments whether or not specified in this disclosure. For example, a consumer member may take its own pictures of items, or environments, via its own camera and which may provide the image contemplated within a particular embodiment.

In still a further regard, it is appreciated that certain consumer product store embodiments may include items identified for sale by the consumer member itself (i.e. not necessarily from an otherwise identified vendor member). According to one example for illustration, a consumer member may take a picture of its living room, and manually tag and identify products in the living room picture associated with the consumer member for sale to other consumer members with whom the tagged picture is shared.

In still another regard, various present embodiments contemplate certain leveraged uses of social networks or other form of sharing within the environment and related to enhanced sCommerce. Such sCommerce embodiments may use, for example, social networks as sources of products or other related information. It is further contemplated that other commercially available environments such as provided via "Instagram™" or "Pinterest™" may be linked or otherwise integrated within the environment contemplated by the present embodiments. Such may provide, for example, sources of items or environment images on which activities are conducted by consumer members according to the present embodiments, or may provide a destination venue for linked sharing of items from within the environment.

The present disclosure also provides various descriptions of products or items, or images, which are selected or otherwise identified for certain purpose-related activities. It is appreciated that, according to various such embodiments, such items may be rendered on a user interface display, and which rendering may be clicked or tapped in order to initiate a certain activity related to the item. Such activity may then be conducted, for example, by clicking or tapping another displayed icon or other text or graphical indicator for the activity, or by dragging or swiping the item to such icon or indicator.

For example for illustration, under certain indexed virtual reality embodiments herein described, a canvas viewer window may be provided for importing an environment image and then a related product image into the environment image. The environment image and/or product image may be made available within another window on the display, and which can then be clicked or tapped for selection and then importation into the canvas viewer window, again such as by either then clicking or tapping a desired location within the viewer, or dragging or swiping the selected image to the respective location.

In another example for further illustration, a browser window may be provided in a display, with a toolbar window also provided on the display and with certain icons or other text or graphical indicia for certain operations available to a user. According to one embodiment under this example, a product viewed in the browser window may be clicked or tapped, and dragged or swiped to such an icon on the toolbar associated with the consumer member store, or associated with a particular sharing target or group, to thereby immediate conduct the saving or sharing activity related to that product. For still further illustration, the embodiment immediately above may also similarly apply to a fused, indexed virtual reality image of a product embedded within its environment (per such related embodiments elsewhere herein described).

It is further contemplated, among the present embodiments, that eCommerce activities and transactions are managed in a highly secured manner between registered vendor and consumer members of the controlled eCommerce environment. For example, security tokens and/or organization identifications (ID) may be required in order to become a registered member of the environment. Moreover, certain regulations may be implemented regarding member status and transactional behavior within the environment, with monitoring conducted in order to maintain (or conversely lose) member status and related privileges. In a further example for illustration, items available from vendor members and accessed by consumer members may be regulated to only evoke certain links related to only certain related activities, and to prevent others (e.g. to prevent potential phishing, fraud, or other restricted activities).

Various aspects, modes, and embodiments herein shown and described, including by reference to the Figures, have been presented in the context of a combination system with multiple functional sub-environments within a broader managed eCommerce environment and system architecture, such as for example provided at sub-environments shown at 65, 70, 75, 80, and 85 within eCommerce environment 50 in FIG. 1. Such combined environment provides a number of distinct benefits, such as for example sharing various support structures and activities, such as for example for providing common databases with product ID and other product purchase-related information that may be otherwise derived from different sources, and/or tracking and providing benefits to consumers or businesses for sharing items with other consumers potentially resulting in downstream item purchases. Examples of product ID information that may be suitably provided within such product databases may comprise one or more of quick response (QR), general specifications (GS1), or universal product (UPC) codes.

However, it is also to be appreciated that each such sub-environment represented by such various more specific aspects, modes, and embodiments of this disclosure are also independently beneficial, and do not necessarily require inclusion within the broader eCommerce Environment 50 or in combination with the other aspects, modes, and embodiments disclosed. For example, each of the sub-environments shown at 70, 75, 80, and 85 of FIG. 1—and their related system architecture and methods, respectively—may be provided alone and without requiring further combination with others of these sub-environments. Moreover, sub-combinations between less than all of these sub-environments are also herein contemplated within the scope of this disclosure. Still further, such individual sub-environments, and the combinations and sub-combinations between them, may also be further combined with other features and sub-environments providing other value to members of the respective environment.

Certain embodiments are herein described by reference to various processors and user interfaces including user input interfaces and user output interfaces such as "displays". It is to be appreciated that numerous specific embodiments for such interfaces may be appropriately provided to meet a specific need and target environment of users, or subject matter, whether or not specifically shown or described. According to one particularly beneficial system implementation, however, a respective environment embodiment will be implemented via a web-enabled service and related support engines, networked system environments, and interfacing devices. According to a still further beneficial mode of this web service, the environment, system, and methods are configured to support a user interface (UI) via a mobile computing device with a touch screen and by providing a UI application or 'app' that may be opened for interactive use by a touch icon providing indicia for the respective environment and related service. This may be for example a 'thin client' software module, that may for example be downloadable onto a mobile computing device, and configured to interface via internet connectivity with a remotely located environment host computer or server (or computer or server network) that provides an underlying engine for hosting transactions via the UI provided via the app. Such 'app' approach may also be provided via other computing devices, including in certain implementations wherein a display may be separate from other UI input devices, e.g. keyboard, mouse, etc., versus touch screen.

Such applications contemplating use of mobile computing devices can include, for example, a multi-functional computing device for cellular telephony/messaging (e.g., feature phone or smart phone), a tablet device, an ultramobile computing device, or a wearable computing device with a form factor of a wearable accessory device (e.g., smart watch or bracelet, glasswear integrated with a computing device, etc.). According one such example for illustration, a scan or "airtag" related to a product registered under the environment can be captured via a smart watch or other mobile computing device by a consumer member during a real-life experience or observation and stored in the consumer product store for later review, purchase, or sharing—or for immediate purchase or sharing.

One or more embodiments described herein provide that methods, techniques and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors, such as computer processors. In the case of such computer processors, these instructions may be carried on a computer-readable medium. Machines shown or described with figures below provide examples of processing resources and computer-readable mediums on which instructions for implementing embodiments of the disclosure can be carried and/or executed. In particular, the numerous machines shown and/or described under certain embodiments include one or more processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

The various embodiments of this disclosure also include a user interface. In certain embodiments, this may include, for example, a graphical user interface (GUI). The user interface in certain such embodiments can present information to a user, such as for example the product or other item information referenced in certain embodiments, and/or their environment(s) of use, and/or other related information such as purchase information. The user interface systems may also include user input as well as user output interfaces (such as displays). According to some embodiments, the user interface can be a passive display or an active touch display (e.g., a capacitive or resistive touch screen). Further examples may include, for example, display and rendering platforms such as: "Magic Leap™" (such as described at www.magicleap.com); or "Oculus Rift™" provided by Oculus VR™ (such as described at www.oculus.com); or Google Glass™" provided by Google (such as for example described at www.google.com/glass).

Figure 8:
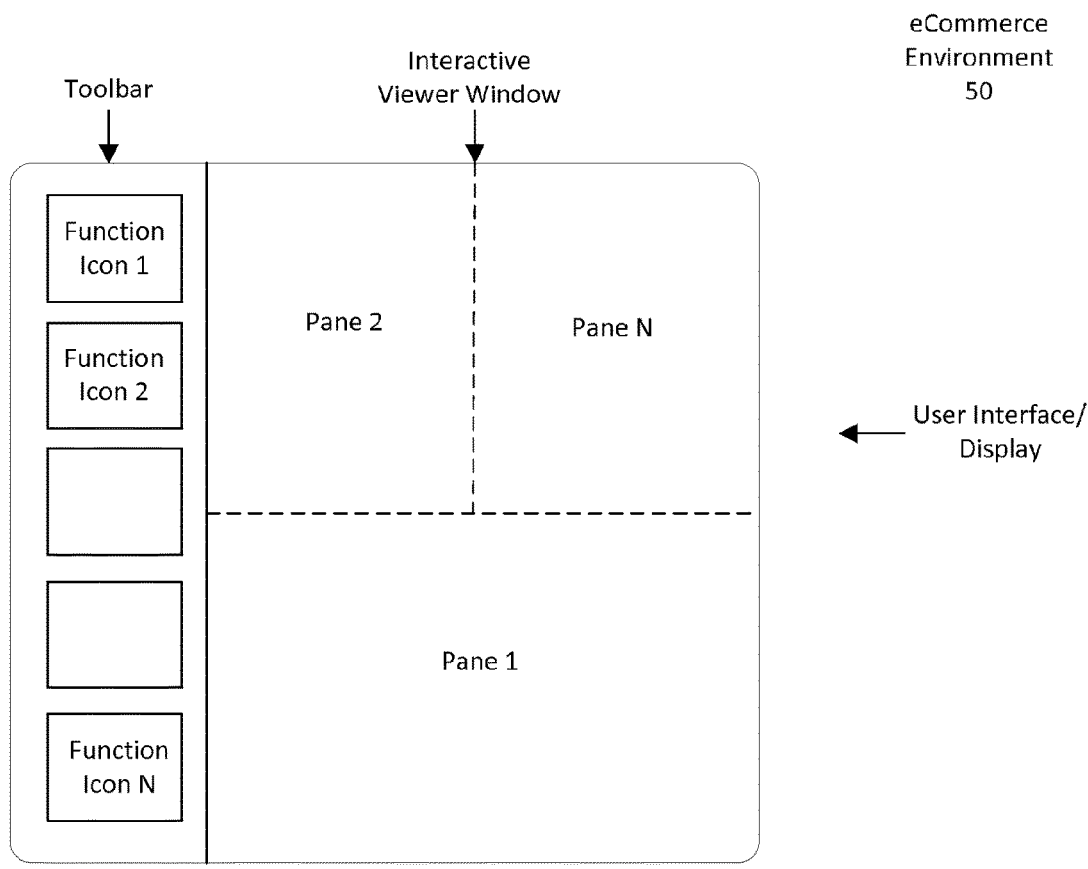
FIG. 8 shows a schematic diagram of an eCommerce environment according to another aspect of this disclosure.
Figure 8:
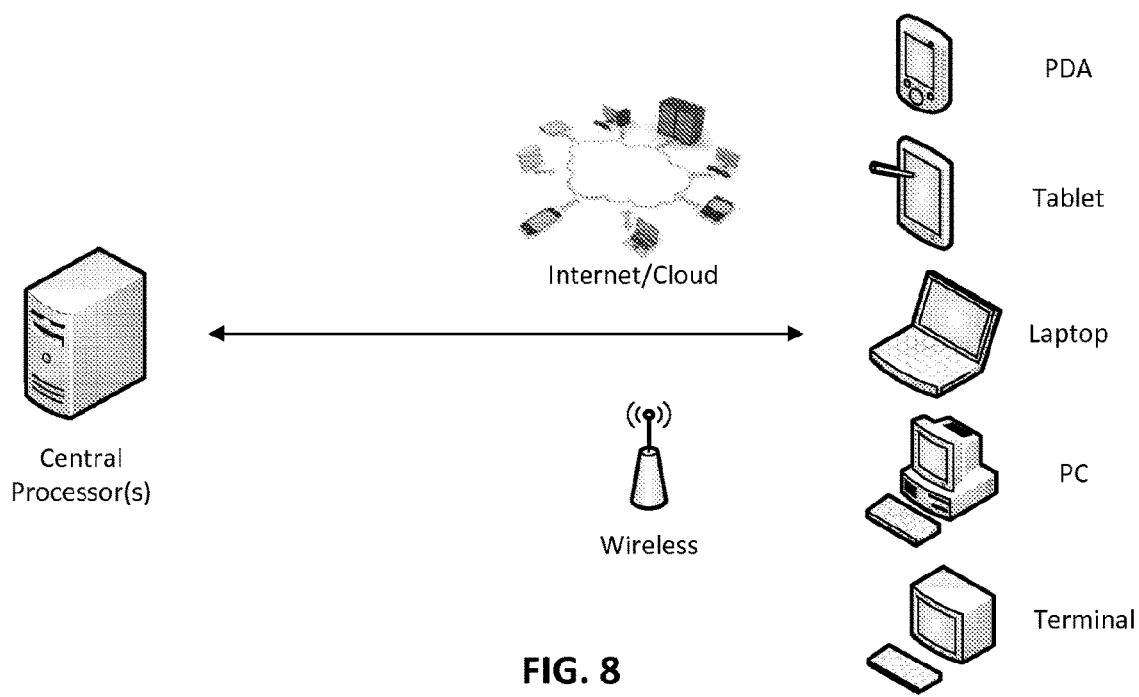

FIG. 8 illustrates certain further examples of a system architecture for providing and supporting an eCommerce Environment 50, and considered applicable under the various embodiments elsewhere herein described. More specifically, one or more processors are shown that operate according to a set of instructions to perform various operations supporting a user interface system that includes a user input interface and a user output interface provided generally as a display. A user may access the eCommerce Environment 50, such as via web access, and which may be for example via "cloud"-hosted application, and/or which may entail wireless connectivity, via a remote computing device that may be for example as elsewhere herein described and/or according to the examples shown in FIG. 8 (e.g. laptop, notebook, etc.). The user interface/display may take many different specific forms, generally with one or more windows serving particular purposes within the managed user interface environment. In the example shown in FIG. 8, a window of the display provides a "toolbar" that comprises a number of N features (e.g. graphical features, e.g. identifiable functions or "icons") that may be selected by a user for further operation according to the respective features' intended uses. An interactive viewing window of the display, and which in some embodiments also provides a user input interface, provides functionality for the operations invoked by selecting one or more of the features. For further illustration, a number of N panes (which may be the same or a different number than the N features) are provided in the interactive viewing window, and to allow different interactive operations to be performed in each pane in relation to the features selected from the toolbar. For example, one or each of the sub-environments elsewhere herein described (e.g. Indexed Virtual Reality Consumer Experience 70, World Experience Point of Purchase (POP) 75, B-C-C sCommerce 80 and related integration & reward system, and Consumer Product Store 85) may be represented and invoked by respective features in the toolbar, either separately or in parallel—and with respective interactive functionality provided via the various different panes.

According to one particular example for further illustration, Indexed Virtual Reality Consumer Experience 70 may be provided via a feature icon in the tool bar. Upon selecting this feature to invoke this environment for a consumer experience, panes may be opened in the interactive viewer window that may include, for example, a canvas viewer pane, a product image pane, and an environment image pane. The product and environment image panes may provide a browsing window to browse a number of images for selection by the user. Upon selecting an environment image from the environment image pane may be clicked and dragged, or tapped and swiped, into the canvas viewer pane. A product image may then be selected from the product image pane and similarly imported into the canvas viewer pane for incorporation into the environment image. In still another example, the consumer product store 85 may also be represented by a respective feature icon in the toolbar, and/or as a pane provided for that functionality. A product, or indexed virtual reality image, may be selected from one pane and then moved to the consumer product store pane (or simply to the respective icon) in order to save that product image into the consumer product store.

It is further appreciated that other functional "selectable" features/icons may also be provided, despite not being specifically shown or described, to implement various operations supported within the respective environment provided. For example, one or more social networks and/or groups thereunder may be accessed for sCommerce experiences via such an icon and related browsing/viewing arrangement.

While the user interface of FIG. 8 provides one example, other specific user interfaces (e.g. display) may be designed and rendered differently for different types of users, e.g. vendor members versus consumer members, and may provide for certain customizability with respect to lay-out and/or features presented to the user within the toolbar (e.g. chosen default features to suit a particular user members' preferred activities, and/or sub-folders such as for example categorizing items saved in a respective user's consumer product store).

Figure 9:
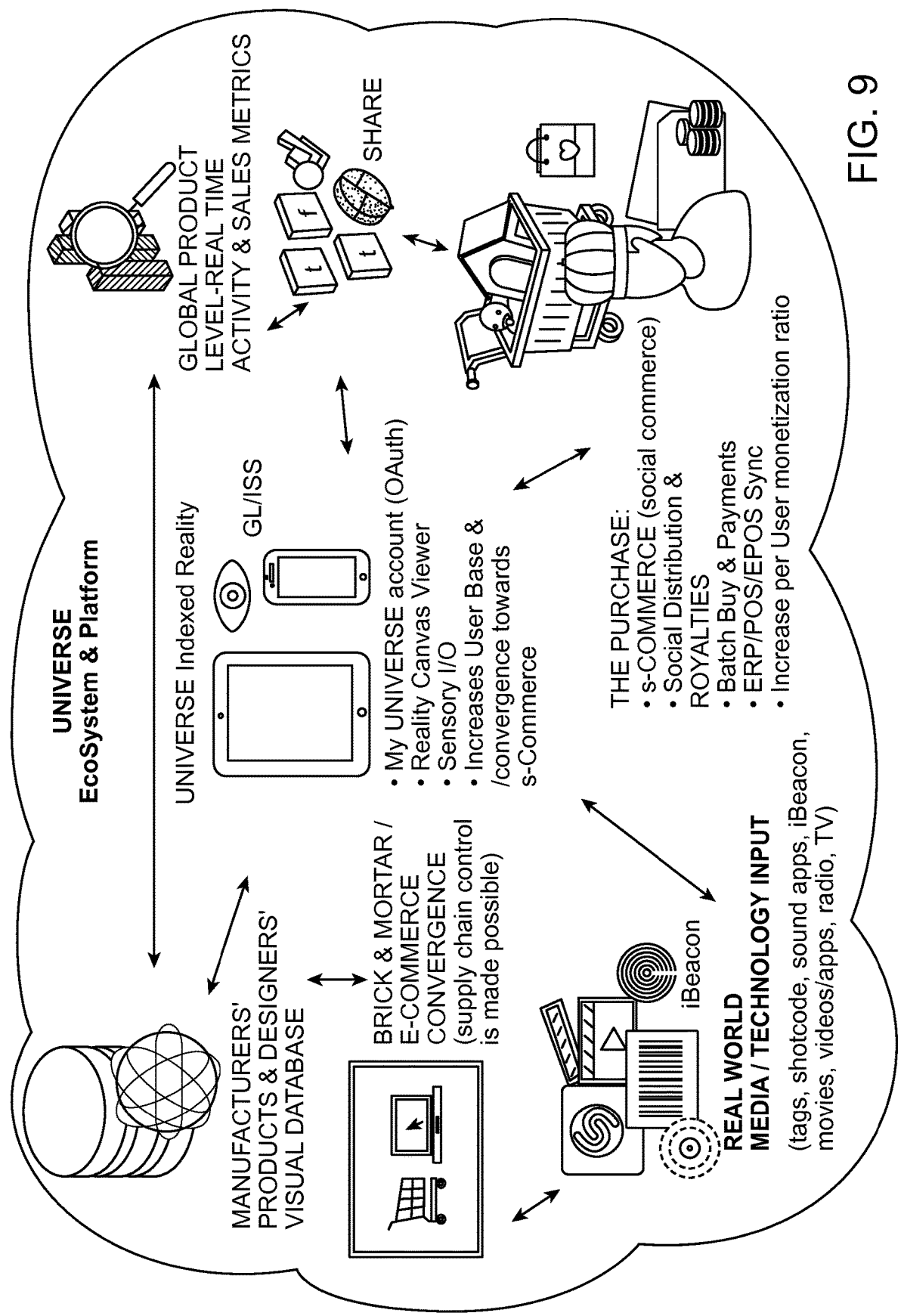
FIG. 9 shows a schematic diagram of an eCommerce environment according to another aspect of this disclosure.

The above examples described by reference to FIG. 8 (and as also shown in FIG. 9 for still further illustration) are considered further beneficial embodiments of this disclosure. However, it is appreciated that various other specific implementations may be made, either in addition or alternative to the examples shown and described, without departing from the intended scope of this disclosure and as relates to other embodiments described herein. For example, other layouts of a screen display related to features/icons, and/or interactive or viewing panes, etc. may be made for a particular purpose and still remain consistent with this disclosure.

Various embodiments herein shown and described are further summarized as follows. An electronic commerce (eCommerce) environment is provided to facilitate multiple financial, product purchase, and sharing transactions between subscribing vendor members and consumer members of the environment. The environment is securely operated via one or more computer processors operated according to a set of instructions in a computer readable medium, and a user interface system with a user input interface and a user output interface, such as a display. The user interface may include a touch screen of a mobile computing device, such as a mobile phone or notepad, and may be presented as an application invokable via a touch icon on the touch screen. Digital images of products provided by vendor members may be imported into digital images of environments of intended use by consumer members (e.g. furniture products in rooms, clothing or jewelry on people, etc.). Vendor members may also embed media transmissions (e.g. movies, pictures, shows, advertisements, audio) with representations and ID/purchase information tags for their respective products, services, or other sales items, and which can be scanned by (or otherwise identified to) consumer members to enable purchasing, saving for later purchase, or sharing of the products. A business-to-consumer-to-consumer (B2C2C) social commerce (sCommerce) environment rewards consumer members for sharing products with other consumer members. Consumer members are allowed to create their own consumer product store by creating an inventory of saved items sourced within the environment, and that is maintained within their consumer member user account (which may be off-line or otherwise) for later access, recall, and purchase (or sharing or other form of transaction). Sharing of consumer product stores between consumer members provides a consumer-integrated marketplace within the B2C2C sCommerce environment.

It is thus to be appreciated by one of ordinary skill that further embodiments of the various broad aspects this disclosure above are also contemplated, either in addition to or in the alternative to the more detailed examples described above or by reference in the Figures.

For example, while various aspects of this disclosure may reference 'purchase' transactions, it is further contemplated that such is exemplary of a more general scope of 'transactions' that may be conducted with or around a product or service featured in the aspect described. For example, even a purchase transaction may take multiple forms. In one regard, an item may be bought/acquired and owned as a result of such a purchase transaction, and which may apply to tangible physical goods or electronic products (e.g. mp3s, DVDs, other audio or video files such as eBooks, etc.). Or, such purchase transactions may instead purchase a license for limited permitted use, such as for example a rental of such types of products described above.

Other transactions contemplated hereunder may also be, for example, saving/storing, reviewing, or sharing—either in conjunction with or apart from purchasing. In addition, however, other activities are also contemplated within such broad scope of 'transaction.' Moreover, for embodiments related to tagged media transmissions or performances, the tagging and transaction may often relate to one or more features embedded in or otherwise associated with such media performance (e.g. the name of a singer and/or identification to the specific performance for purpose of voting in a contest setting) vs. tagging and transacting around the whole of the media performance itself (e.g. recognizing and purchasing the actual singing performance itself).

In one particular such further example, a consumer member may conduct a 'voting' transaction (e.g. vote) in relation to an item saved, scanned/tagged, or otherwise featured under the respective embodiment. In one exemplary mode of this aspect, the various aspects of the World Experience POP 75 environment, e.g. as elsewhere herein described by reference to FIG. 4, may instead apply to voting for the respective scanned or tagged item—in the alternative (or in addition to) saving, sharing, or initiating a purchase transaction for such scanned or tagged item.

According to one such further embodiment, this may apply for example to performance contests wherein an audience of a media transmission for the performances votes on their favorite (or conversely least favorite) performance of the contest. This may be conducted, for example, by scanning the performance itself, which triggers (either by a feature of the performance itself or an embedded or otherwise corresponding tag) a link to a voting input that can be actuated and/or transmitted by the consumer user back to the appropriate contest environment for entry and counting. For further understanding, this may be applied, for example, to performance contests such as hosted by the television broadcast program "The Voice™." This provides the distinct benefit of transforming and further automating, via more efficient computing interface and fewer required user steps or inputs, the original performance transmission to the consumer's vote entered and received by the contest host.

In another further example, a consumer member may conduct a 'funding' transaction under the hosted environment—as may be distinguished in many cases from a purchasing transaction per se. Such may be for various non-profit or for-profit causes. In one example for illustration, a political campaign advertisement transmission may be tagged with a link for making a campaign contribution. Other examples may further include other transmissions related to causes which may be similarly funded by such consumer members in the receiving audience.

Certain aspects of this disclosure address media transmissions, and related media performances and media content contained therein. It is appreciated that a media performance comprises both active (e.g. in the act of the performance)

and static states (e.g. an electronic form of a performance that may be invoked by an appropriately formatted player).

Certain other aspects of this disclosure are described by way of examples embodied in commercial relationships and transactions between consumers and vendors of products (and other items)—such as for example in B-to-C contexts for product sales/purchases. Other aspects are herein described by reference to C-to-C (consumer:consumer) relationships. However, it is appreciated these terms themselves are relative labels. For example, such aspects of this disclosure that position consumers relative to vendors in potential eCommerce transactions may also be similarly applied to other circumstances, also contemplated hereunder, between businesses (e.g. B2B). For example, various such embodiments as herein described present similar benefits for transactions in supply chain procurement, such as for example facilitating requests for proposals or "RFPs" (i.e. solicitations, often made through a bidding process, by an agency or company interested in procurement of a commodity, service or valuable asset, to potential suppliers to submit business proposals).

Certain aspects of this disclosure also reference consumer and/or vendor 'members' in context of 'subscribing' to the hosted environment of the respective embodiment described. It is to be appreciated that such subscription may be beneficially a fee-based service in certain instances. However, it is also to be appreciated that such subscription may not require such fee payment in other instances. In some examples, such 'subscription' may thus merely reference a member with a respective user account (and related information related to performing the respective hosted activities) registered within the system. In other applications, 'members' need not be registered or subscribed at all—but certain such embodiments may be made available to them for their use in conducting such e-commerce transactions under a footprint providing other benefits than provided by fee subscriptions (e.g. wider reach and access between consumers and vendors, although information such as payment information and the related ability to transact purchases without such being provided in advance, security risk management, etc. may be compromised in such less managed non-registered uses).

The following references are herein incorporated in their entirety by reference thereto: U.S. Provisional Patent Application Ser. No. 62/018,500, filed on Jun. 27, 2014; U.S. Provisional Patent Application Ser. No. 62/020,936, filed on Jul. 3, 2014; U.S. Provisional Patent Application Ser. No. 62/020,947, filed on Jul. 3, 2014; U.S. Provisional Patent Application Ser. No. 62/023,070, filed on Jul. 10, 2014; U.S. Provisional Patent Application Ser. No. 62/053,590, filed on Jul. 11, 2014; U.S. Provisional Patent Application Ser. No. 62/024,589, filed on Jul. 15, 2014; U.S. Provisional Patent Application Ser. No. 62/027,660, filed on Jul. 22, 2014; and U.S. Provisional Patent Application Ser. No. 62/073,808, filed on Oct. 31, 2014. The disclosures of these references are considered further embodiments which may be implemented or adapted within the broad scope of, or in combination with, certain embodiments herein shown and/or described, as will be apparent to one of ordinary skill based upon a review of the totality of this disclosure.

Although illustrative embodiments are described in detail herein with reference to the accompanying Figures, variations to specific embodiments and details are encompassed by this disclosure. It is intended that the scope of embodiments described herein be interpreted broadly, except where expressly limited. Furthermore, it is contemplated that a particular feature described, either individually or as part of an embodiment, can be combined with other individually described features, or parts of other embodiments—including such combinations that may not be specifically described or shown herein, as apparent to one of ordinary skill based on the totality of this disclosure. Thus, absence of describing such specific combinations does not preclude such combinations from the intended scope that are contemplated and/or may be claimed herein, either specifically for such combination or as included within a broader scope intended to cover such combination among other possible embodiments.

Although illustrative embodiments have been described in detail herein with reference to the accompanying drawings, variations to specific embodiments and details are encompassed by this disclosure despite not being specifically described. It is intended that the scope of embodiments described herein be defined by claims and their equivalents. However, the right is preserved and not waived to claim various aspects, modes, and/or embodiments disclosed herein despite such being absent from the originally or later filed claims. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for creating, managing, and conducting transactions through, a consumer-controlled electronic product store, comprising:

providing an eCommerce environment comprising a database system, a user interface system comprising a consumer interface operable at least in part by at least one consumer computing device to receive user inputs from and provide information to the consumer, and at least one computer processor;

operating the at least one computer processor to process a set of instructions to:

receive at least one subscription input from the consumer via the consumer interface to subscribe as a consumer member of the environment by creating a consumer member account with a corresponding consumer ID and one or more respective consumer member records within the database system, and such that the consumer member may log off-line out from and then log on-line back into the environment via the consumer interface;

provide a readable storage in the database system for the consumer to store an inventory of saved item records under the consumer member account as a consumer product store controlled by the consumer;

in response to item save inputs from the consumer member via the consumer interface, store item records, which comprise item identification (ID) information tagged to correspond with and identify respective items for potential purchase, in the consumer product store under the respective consumer member's account;

maintain the consumer member's inventory in the consumer product store while the consumer is logged off-line from the environment, such that the saved item records are thereafter recallable by the consumer member from the inventory at a later on-line access event and time;

in response to a transaction input for a saved item record, conduct a transaction for the respective item;

provide at least one vendor access to review the consumer product store;

receive an offer input from a respective said vendor offering a corresponding set of vendor terms for selling an item associated with a saved item record in the consumer product store;

notify the consumer member of the offered vendor terms; and conduct at least one of: (a) in response to a counter input from the consumer member comprising a set of counter terms offered by the consumer member back to the vendor, notify the respective vendor of the counter terms for a vendor acceptance, rejection, or further counter-offer; or (b) in response to a purchase input from the consumer member corresponding with the offered vendor terms, conduct the purchase transaction for the item between the consumer member and the respective vendor according to the vendor terms; and receive the offer input from the respective said vendor when an elapsed time or distance meets a threshold criteria;

and wherein the method further comprises:

monitoring a changing location of the consumer member over time;

calculating a distance between the consumer member location and the location of the at least one vendor; and providing the access for the at least one vendor to review the consumer provider store, and also with an opportunity to provide the offer input with the offered vendor terms, when the distance is below a threshold criteria.

2. The method of claim 1, wherein:

the item ID information comprises product ID information that comprises at least one of a quick response (QR) code, general specifications (GS1) code, or universal product code (UPC).

3. The method of claim 1, wherein:

the transaction input comprises a share input from the consumer member; and the transaction comprises sharing the item record with another consumer member or via a social network.

* * * * *